(12) United States Patent
Chapman et al.

(10) Patent No.: US 9,387,628 B2
(45) Date of Patent: Jul. 12, 2016

(54) METHOD AND APPARATUS FOR FABRICATING COMPOSITE STRINGERS

(71) Applicant: The Boeing Company, Chicago, IL (US)

(72) Inventors: Michael R. Chapman, Federal Way, WA (US); Khanh M. Pham, Kent, WA (US)

(73) Assignee: THE BOEING COMPANY, Chicago, IL (US)

(*) Notice: Subject to any disclaimer, the term of this patent is extended or adjusted under 35 U.S.C. 154(b) by 19 days.

(21) Appl. No.: 14/219,629

(22) Filed: Mar. 19, 2014

(65) Prior Publication Data

US 2014/0203477 A1    Jul. 24, 2014

Related U.S. Application Data

(63) Continuation-in-part of application No. 13/916,779, filed on Jun. 13, 2013, which is a continuation-in-part of application No. 13/217,109, filed on Aug. 24, 2011, now Pat. No. 8,465,613.

(51) Int. Cl.
*B29C 65/14* (2006.01)
*B29C 70/46* (2006.01)
*B29L 31/00* (2006.01)

(52) U.S. Cl.
CPC ......... *B29C 70/462* (2013.01); *B29L 2031/001* (2013.01)

(58) Field of Classification Search
CPC ............ B29L 2031/001; B29C 70/462; B29C 65/1612; B29C 65/1632; B29C 65/1635; B29C 65/1667; B29C 65/1687; B29C 66/1142; B29C 66/73921; B29C 66/543; B29C 66/91216; B29C 66/91221; B29C 65/1403; B29C 66/8322; B29C 66/54
USPC .......................................... 264/296; 425/112
See application file for complete search history.

(56) References Cited

U.S. PATENT DOCUMENTS

| | | |
|---|---|---|
| 1,433,879 A | 10/1922 | Fancher et al. |
| 1,965,716 A | 7/1934 | Thorns et al. |

(Continued)

FOREIGN PATENT DOCUMENTS

| | | |
|---|---|---|
| CA | 2487697 A1 | 5/2006 |
| DE | 742682 C | 12/1943 |

(Continued)

OTHER PUBLICATIONS

International Search Report and Written Opinion, dated Sep. 30, 2014, regarding Application No. PCT/US2014/038916, 10 pages.

(Continued)

*Primary Examiner* — Jacob T Minskey
*Assistant Examiner* — Vishal I Patel
(74) *Attorney, Agent, or Firm* — Yee & Associates, P.C.

(57) ABSTRACT

Method and tooling apparatus for forming a composite charge into a stringer having an I-shaped cross-section. A substantially flat composite charge is placed on a die set and pressed formed into a die set cavity to form a stringer hat. A stringer base is formed by press forming the composite charge against the die set. The die set is used to compress the stringer hat into a stringer web having a bulb on one end thereof. A stringer cap is formed by press forming the bulb within a recess in the die set.

10 Claims, 23 Drawing Sheets

FIG. 55

(56) References Cited

U.S. PATENT DOCUMENTS

| | | | |
|---|---|---|---|
| 3,693,924 | A | 9/1972 | Blatherwick |
| 3,843,756 | A | 10/1974 | Talbott et al. |
| 3,990,291 | A | 11/1976 | Evertz et al. |
| 4,254,735 | A | 3/1981 | Postupack et al. |
| 4,270,964 | A | 6/1981 | Flaskett |
| 4,338,070 | A | 7/1982 | Nava |
| 4,366,698 | A | 1/1983 | Gill |
| 4,367,644 | A | 1/1983 | Kramer et al. |
| 4,475,976 | A | 10/1984 | Mittelstadt et al. |
| 4,504,341 | A | 3/1985 | Radzwill et al. |
| 4,614,558 | A | 9/1986 | Kobe |
| 4,657,717 | A | 4/1987 | Cattanach et al. |
| 4,946,526 | A | 8/1990 | Petty-Galis et al. |
| 4,980,013 | A | 12/1990 | Lowery |
| 5,022,248 | A | 6/1991 | Brooks et al. |
| 5,108,532 | A | 4/1992 | Thein et al. |
| 5,188,787 | A | 2/1993 | King et al. |
| 5,286,438 | A | 2/1994 | Dublinski et al. |
| 5,304,057 | A | 4/1994 | Celerier et al. |
| 5,327,764 | A | 7/1994 | Weykamp et al. |
| 5,366,431 | A | 11/1994 | Smith et al. |
| 5,366,684 | A | 11/1994 | Corneau, Jr. |
| 5,464,337 | A | 11/1995 | Bernardon et al. |
| 5,582,058 | A | 12/1996 | Knudson |
| 5,707,576 | A | 1/1998 | Asher |
| 5,714,179 | A | 2/1998 | Goodridge et al. |
| 5,772,950 | A | 6/1998 | Brustad et al. |
| 5,846,464 | A | 12/1998 | Hoffman |
| 5,882,462 | A | 3/1999 | Donecker et al. |
| 6,089,061 | A | 7/2000 | Haas et al. |
| 6,139,942 | A | 10/2000 | Hartness et al. |
| 6,299,819 | B1 | 10/2001 | Han |
| 6,558,590 | B1 | 5/2003 | Stewart |
| 6,723,272 | B2 | 4/2004 | Montague et al. |
| 6,749,784 | B2 | 6/2004 | Blanchon |
| 6,814,916 | B2 | 11/2004 | Willden et al. |
| 6,855,284 | B2 | 2/2005 | Lanni et al. |
| 6,929,770 | B2 | 8/2005 | Caldwell, Jr. |
| 7,091,300 | B2 | 8/2006 | Luhmann et al. |
| 7,118,370 | B2 | 10/2006 | Willden et al. |
| 7,141,199 | B2 | 11/2006 | Sana et al. |
| 7,306,450 | B2 | 12/2007 | Hanson |
| 7,464,508 | B2 | 12/2008 | Fournie et al. |
| 7,527,759 | B2 | 5/2009 | Lee et al. |
| 7,622,066 | B2 | 11/2009 | Brustad et al. |
| 7,655,168 | B2 | 2/2010 | Jones et al. |
| 7,708,546 | B2 | 5/2010 | Lee et al. |
| 7,713,603 | B2 | 5/2010 | Farran et al. |
| 7,959,753 | B2 | 6/2011 | Nunez Delgado et al. |
| 8,465,613 | B2 | 6/2013 | Rotter et al. |
| 8,551,382 | B2 | 10/2013 | Anderson et al. |
| 8,557,165 | B2 | 10/2013 | Jones et al. |
| 8,601,694 | B2 | 12/2013 | Brennan et al. |
| 2004/0043196 | A1* | 3/2004 | Willden ............ B29C 43/12 428/174 |
| 2004/0265536 | A1* | 12/2004 | Sana ............ B29C 70/345 428/119 |
| 2005/0142239 | A1 | 6/2005 | Frank |
| 2007/0039284 | A1 | 2/2007 | Munoz Royo et al. |
| 2009/0117441 | A1* | 5/2009 | Suzuki ............ B30B 11/02 429/535 |
| 2009/0297358 | A1 | 12/2009 | Anderson et al. |
| 2009/0320292 | A1 | 12/2009 | Brennan et al. |
| 2010/0074979 | A1 | 3/2010 | Cundiff et al. |
| 2010/0102482 | A1 | 4/2010 | Jones et al. |
| 2010/0225016 | A1* | 9/2010 | Prebil ............ B29B 33/306 264/39 |
| 2011/0048097 | A1* | 3/2011 | Kobayashi ............ B21J 5/06 72/377 |
| 2011/0195230 | A1 | 8/2011 | Hanson |
| 2013/0049258 | A1 | 2/2013 | Rotter et al. |
| 2013/0340928 | A1 | 12/2013 | Rotter et al. |

FOREIGN PATENT DOCUMENTS

| | | |
|---|---|---|
| DE | 4234002 A1 | 4/1994 |
| DE | 19536675 C1 | 2/1997 |
| EP | 0659541 A1 | 6/1995 |
| EP | 1136239 A2 | 9/2001 |
| EP | 1393873 A2 | 3/2004 |
| EP | 1439121 A2 | 7/2004 |
| EP | 1481790 A2 | 12/2004 |
| EP | 1972428 A2 | 9/2008 |
| EP | 2128019 A1 | 12/2009 |
| EP | 2128019 A2 | 12/2009 |
| EP | 2133263 A2 | 12/2009 |
| EP | 2561979 A2 | 2/2013 |
| FR | 2035314 A5 | 12/1970 |
| FR | 2667013 A1 | 3/1992 |
| FR | 2771332 A1 | 5/1999 |
| FR | 2844472 A1 | 3/2004 |
| GB | 2139934 A | 11/1984 |
| JP | 61043542 A | 3/1986 |
| JP | 2001310798 A | 11/2001 |
| JP | 2004352187 A | 12/2004 |
| WO | WO2004025003 A2 | 3/2004 |
| WO | WO2005095091 A1 | 10/2005 |
| WO | WO2006014825 A1 | 2/2006 |
| WO | WO2006039124 A2 | 4/2006 |
| WO | WO2006048652 A1 | 5/2006 |
| WO | WO2006113048 A2 | 10/2006 |
| WO | WO2007134790 A1 | 11/2007 |
| WO | WO2010047980 A1 | 4/2010 |

OTHER PUBLICATIONS

Notice of Allowance, dated Feb. 19, 2013, regarding U.S. Appl. No. 13/217,109, 11 pages.

"A Composite Preform", IP.com Prior Art Database Technical Disclosure No. IPCOM000007326D, dated Mar. 14, 2002, http://www.ip.com/IPCOM/000007326, 4 pages.

Ando et al., "Growing Carbon Nanotubes," Materials Today, Oct. 2004, vol. 7, No. 10, pp. 22-29.

Brittles, "New Developments in Resin Transfer Moulding," Proc. 19th International Composites Congress, Nov. 1994, pp. 11-26.

EP search report dated Oct. 18, 2011 regarding application 09251515.4, reference P106603EP00, applicant The Boeing Company, 9 pages.

EP search report dated Aug. 5, 2008 regarding application EP08012344, 2 pages.

EP search report, dated Sep. 23, 2010 regarding application EP09160765 (EP2128019), 6 pages.

Garcia et al., "Hybrid Carbon Nanotube-Composite Architectures," MTL Annual Research Report, Sep. 2006, p. 208.

Growing Carbon Nanotubes Aligned With Patterns, NASA Tech Briefs No. NPO-30205, Oct. 2002, http://nasatech.com/Briefs/Oct02/NPO30205.html, 2 pages.

PCT search report dated Oct. 16, 2006 regarding application PCT/US2006/010825, 4 pages.

PCT search report dated Jan. 27, 2010 regarding application PCT/US2009/060245, international filing date Sep. 10, 2009, applicant reference 08-0625PCT, applicant The Boeing Company, 5 pages.

Musch et al., "Tooling With Reinforced Elastomeric Materials," Composites Manufacturing, 1992, vol. 3, No. 2, pp. 101-111.

PCT search report, dated Dec. 7, 2005 regarding application PCT/US2005/026141 (WO2006014825), 3 pages.

Search report, dated May 19, 2006 regarding application PCT/US2005/033279 (WO2006039124), 5 pages.

The Longest Carbon Nanotubes You Have Ever Seen, http://www.spacemart.com/reports/The_Longest_Carbon_Nanotubes_You_Have_Ever_Seen_999.html, May 14, 2007, 1 page.

"The Wondrous World of Carbon Nanotubes", Eindhoven University of Technology, Feb. 27, 2003, 26 pages. http://students.chem.tue.nl/ifp03/Wondrous%20World%20of%20Carbon%20Nanotubes_Final.pdf.

Office Action, dated Nov. 16, 2012, regarding U.S. Appl. No. 12/128,173, 18 pages.

(56) References Cited

OTHER PUBLICATIONS

Final office action dated Jan. 17, 2012 regarding U.S. Appl. No. 12/258,404, 3 pages.
Final office action dated Mar. 11, 2011 regarding U.S. Appl. No. 12/258,404, 8 pages.
Final office action dated Aug. 27, 2010 regarding U.S. Appl. No. 12/258,404, 10 pages.
Non-final office action dated Mar. 19, 2010 regarding U.S. Appl. No. 12/258,404, 9 pages.
Non-final office action dated Jul. 20, 2011 regarding U.S. Appl. No. 12/258,404, 6 pages.
International Preliminary Report on Patentability, dated Dec. 15, 2015, regarding Application No. PCT/US2014/038916, 6 pages.
Office Action, dated Jul. 29, 2015, regarding U.S. Appl. No. 13/916,779, 26 pages.
Notice of Allowance, dated Oct. 2, 2015, regarding U.S. Appl. No. 13/916,779, 20 pages.

* cited by examiner

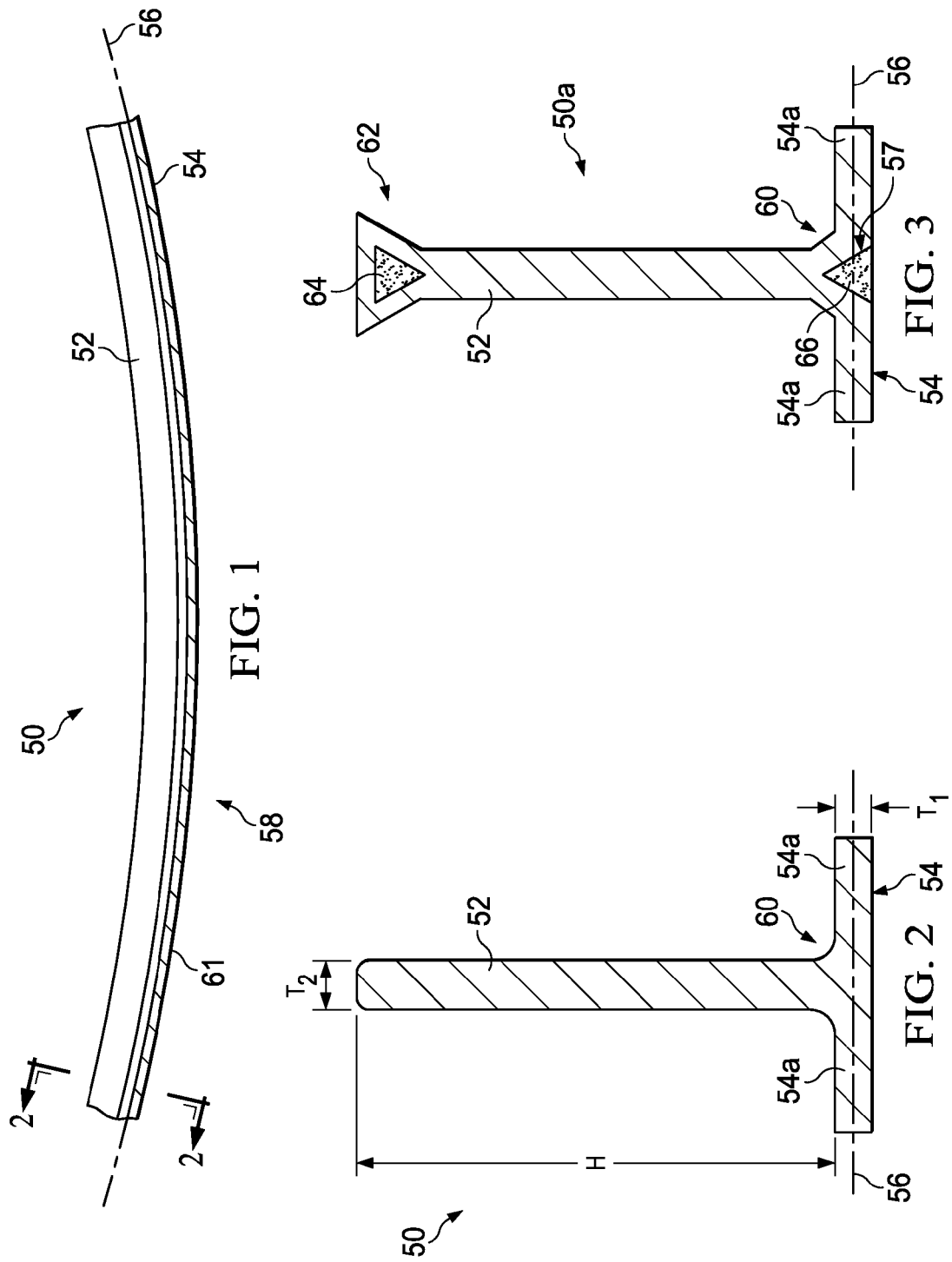

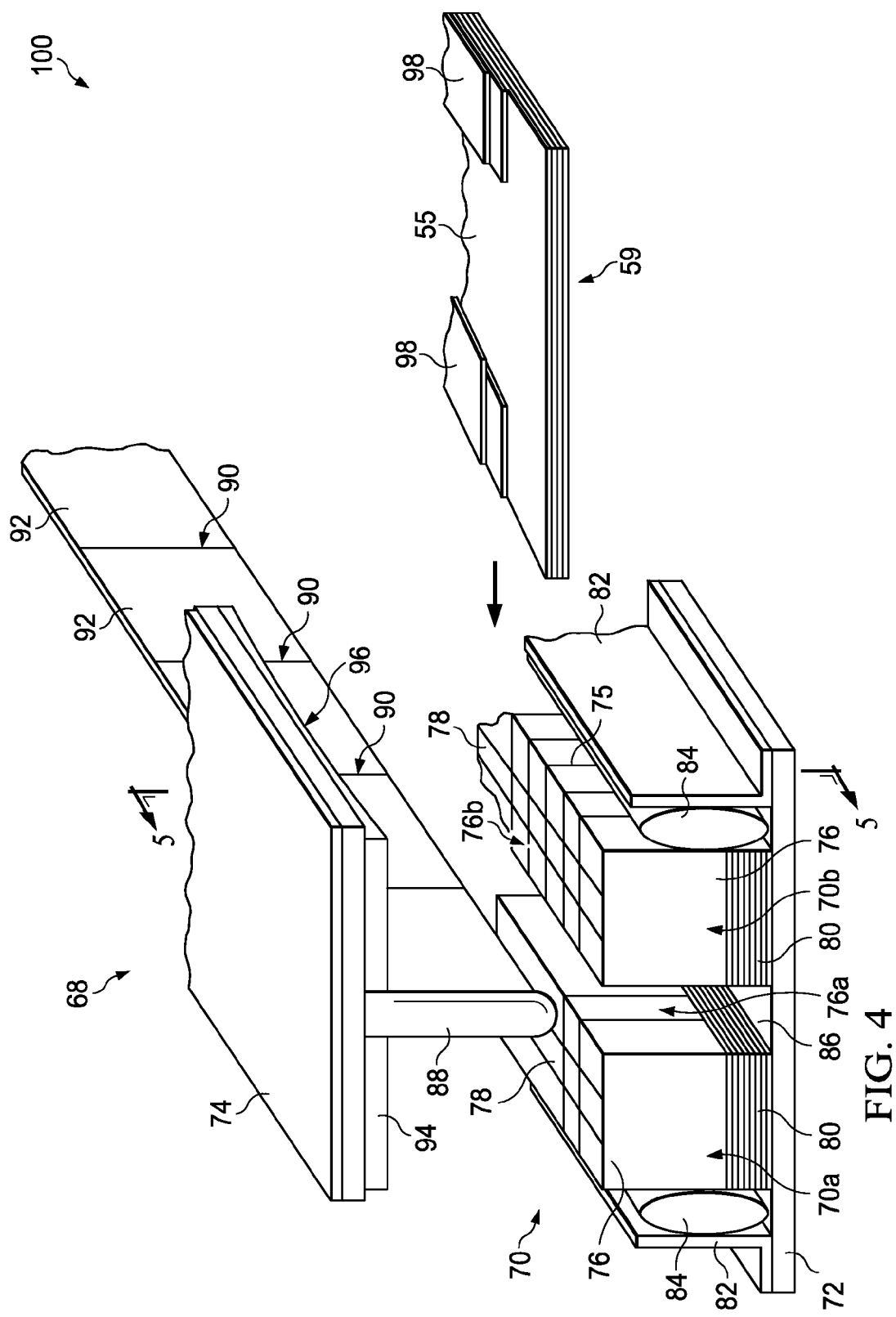

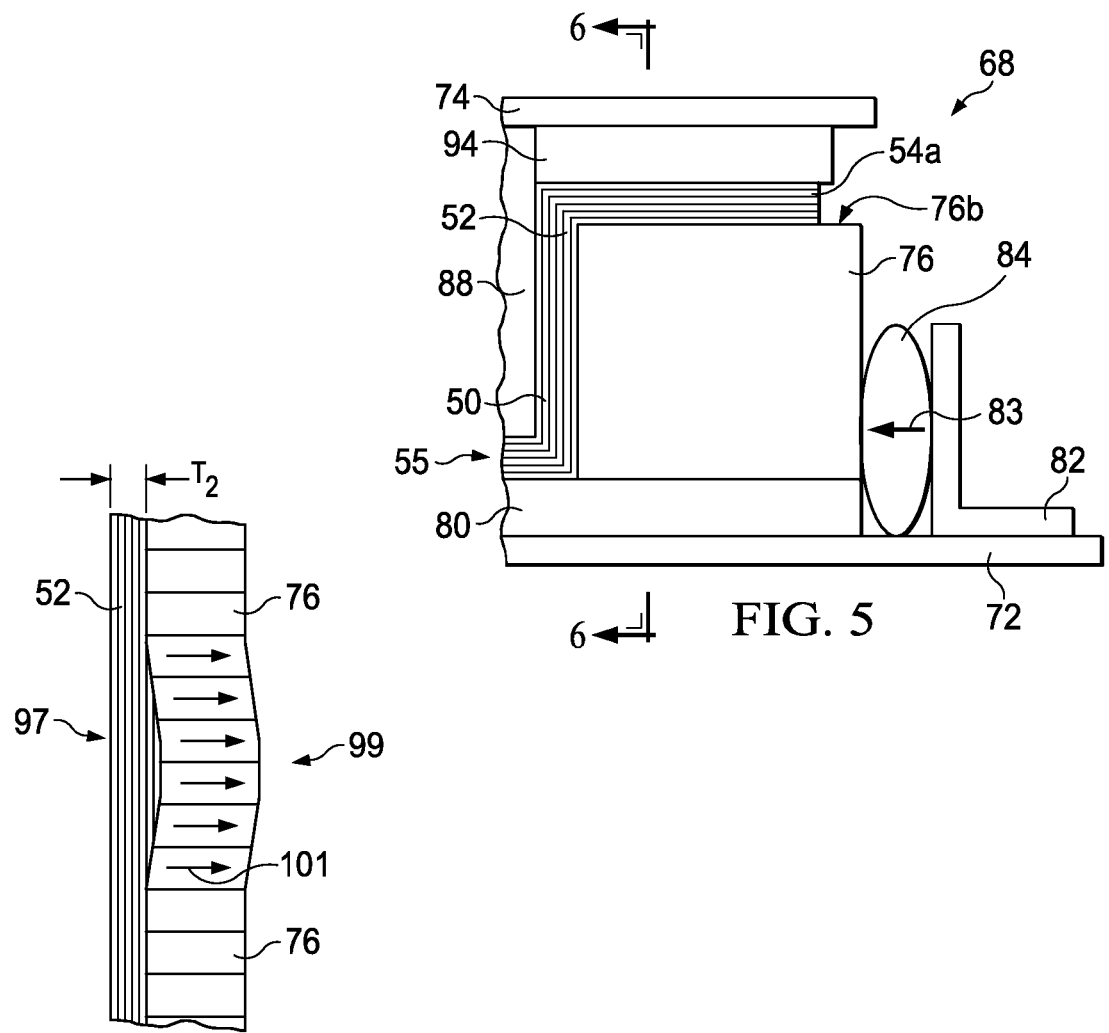
FIG. 5
FIG. 6A
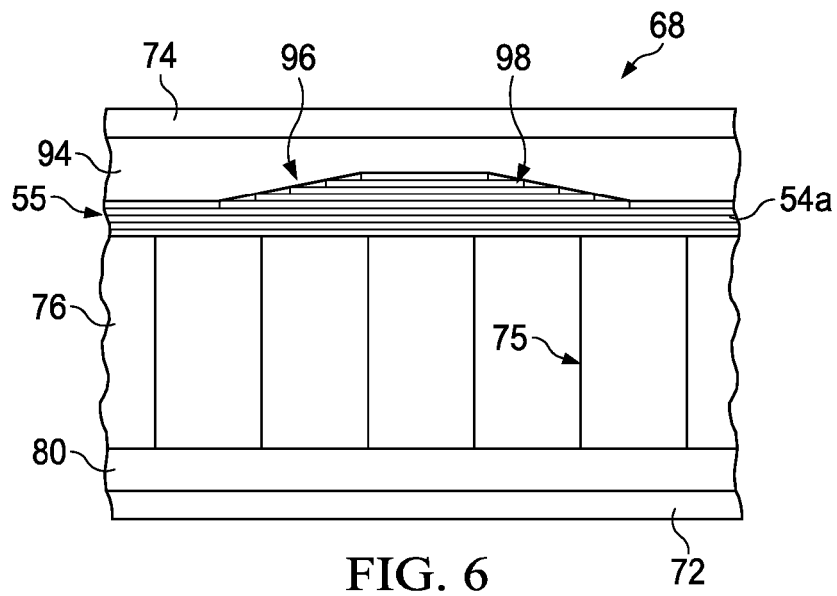
FIG. 6

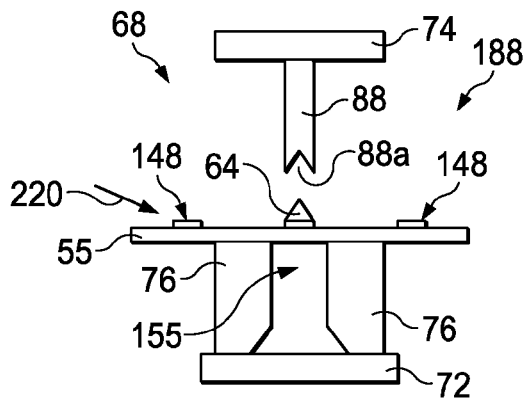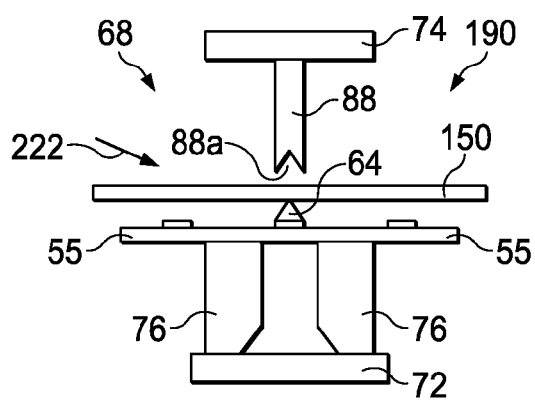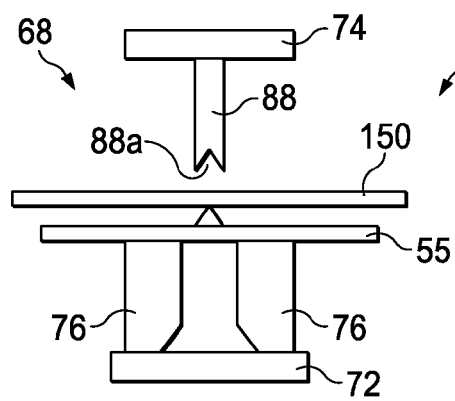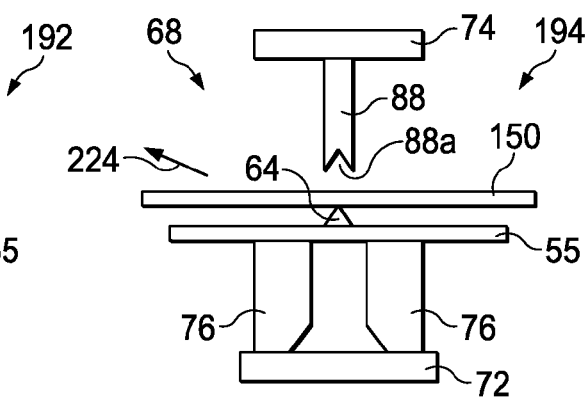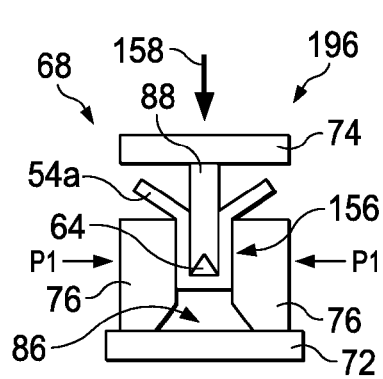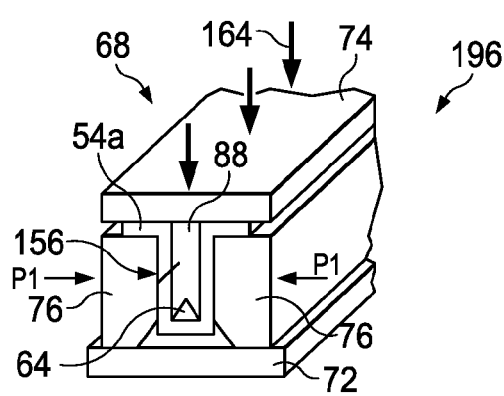

METHOD AND APPARATUS FOR FABRICATING COMPOSITE STRINGERS

CROSS REFERENCE TO RELATED APPLICATIONS

This application is a continuation-in-part application of U.S. patent application Ser. No. 13/916,779 filed Jun. 13, 2013 and published as U.S. Patent Publication 2013/0340928, which is a continuation-in-part of U.S. patent application Ser. No. 13/217,109, filed Aug. 24, 2011, now U.S. Pat. No. 8,465,613.

BACKGROUND INFORMATION

1. Field

This disclosure generally relates to the fabrication of composite structures, and deals more particularly with a method and apparatus for forming flat composite charges into reinforcing substructures, such as blade-type stiffeners, including stiffeners that are contoured and/or have a variable gauge.

2. Background

Composite reinforcing substructures such as blade stiffeners, sometimes referred to as blade stringers, are frequently used in the marine and aircraft industries. These stringers may be fabricated by combining two or more stiffening members. For example, a stringer have an I-shaped cross section, sometimes referred to an I-stringer, can be fabricated by combining two members having a C-shaped cross section, back-to-back. These members may be formed by manually hot drape forming multiple composite charges over a mandrel or other tool. After forming, the members are placed back-to-back and co-cured in an autoclave. Fabricating blade stringers using multiple separate charges requires multiple tools, is relatively labor intensive and may add to manufacturing flow times.

In some applications, stiffeners such as the blade stringers mentioned above, may need to be contoured along their lengths in order to conform them to a structure such as a contoured aircraft skin, to which they are to be attached. Difficulty may be encountered, however, when attempting to form highly contoured stringers using conventional tooling because of the tendency of the plies in the charge to wrinkle as the charge is being compressed. Accordingly, fabrication of highly contoured stringers using composites is generally limited to hand layup techniques in which each ply is laid up by hand over a die or other tool in order to reduce the possibility of ply wrinkling. The hand layup technique is labor intensive, and thus costly as well as relatively slow. An added challenge is presented where one or more areas of the stringer include ply drop-offs and/or pad-ups in order to conform the stringer to local contouring of the skin.

Accordingly, there is a need for a method and apparatus for fabricating composite blade stiffeners such as I-stringers, using a single composite charge formed with relatively simple tooling. There is also a need for a method and apparatus of the type mentioned above that may be adapted to allow contouring of the stringer along its length, including localized contouring using ply drop-offs or pad-ups.

SUMMARY

The illustrative embodiments provide a method and apparatus for fabricating blade type stringers using simplified tooling to form a single composite charge into a desired stringer configuration, such as a stringer having an I-shaped cross section. Tooling costs and process flow times may be reduced by eliminating the need to form multiple charges and assemble multiple stiffener members in order to achieve the desired stringer configuration.

According to one disclosed embodiment, a method is provided of fabricating an I-stringer. A substantially flat composite charge is placed on a die set, and a stringer hat is formed by press forming the composite charge into a cavity formed by the die set. A stringer base is formed by press forming the composite charge against the dies. The die set is used to compress the stringer hat into a stringer web having a bulb on an end of the web. The I-stringer cap is formed by press forming the bulb within a recess in the die set. Press forming the bulb within the recess in the die set includes compressing the bulb between substantially parallel surfaces to form a substantially flat cap, and press forming the bulb within the recess in the die set includes using a plate to apply pressure to the bulb. Pressure is applied to the bulb in a direction substantially normal to the stringer base. Forming the stringer base includes press forming the composite charge against a first end of the die set, and forming the stringer cap includes press forming the bulb against a second end of the die set opposite the first end. Forming the bulb on the end of the web includes forming a portion of the web into the recess in the die set. Press forming the charge into the cavity in the die set is performed using a punch, and compressing the composite charge into a stringer web is performed by applying lateral pressure on the die set. The method may further comprise locally heating the bulb to a forming temperature before the bulb is press formed within the recess.

According to another disclosed embodiment, a method is provided of fabricating a composite I-stringer. A substantially flat composite charge is placed on a die set, and heated to a forming temperature of the composite charge. A filler is placed on the composite charge, and a stringer hat is formed by press forming the composite charge and filler into a cavity formed by the die set. The die set is used to compress the stringer hat into a stringer web, including forming a bulb on an end of the stringer web. A stringer base is formed by press forming the composite charge against the die set. The bulb is press formed into a stringer cap containing the filler, and the bulb is compressed within a recess in the die set. Compressing the bulb within the recess includes compressing the bulb against substantially flat surfaces of the die set within the recess. Compressing the bulb within the recess is performed using a plate to press the bulb against the flat surfaces of the die set within the recess. The method may further comprise heating the composite charge to a forming temperature before the composite charge is compressed into the cavity in the die set.

According to still another disclosed embodiment, a method is provided of fabricating a composite I-stringer. A substantially flat positive charge is folded into a partially formed stringer charge having a bulb, a base and a web extending between the bulb and the base. A first plate is placed against the base, and die portions are position respectively on opposite sides of the web. Shims are placed on the die portions on opposite sides of the bulb. The web is compressed using the die portions. The bulb is heated to its forming temperature. A second plate is placed against the bulb and the bulb is compressed into a substantially flat cap by applying pressure to the second plate. Shims are used to control compression of the bulb into a desired flat cap thickness.

According to a further disclosed embodiment, apparatus is provided for forming a composite charge into an I-stringer. The apparatus comprises a die set including first and second laterally displaceable die portions defining a die cavity therebetween which has a recess adjacent to one end thereof. The apparatus also includes an elongate punch capable of press forming the composite charge into the die cavity. The apparatus further comprises an upper plate for press forming the composite charge against the die set to form a stringer base, and a displaceable press plate for forming the composite charge within the recess to form a stringer cap. The recess is defined by a substantially flat surface extending substantially parallel to the press plate. The recess communicates with and extends laterally outward from the cavity. The apparatus may further comprise a lower plate upon which the first and second die portions are mounted. The press plate is displaceable relative to the lower plate. The apparatus may also include a ram connected to the press plate for applying a force to the press plate. The die set includes an upper surface against which the composite charge is press formed by the upper plate, and a lower surface in which the recess is located.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

FIG. 1 is an illustration of a side view of a contoured composite blade stringer fabricated with the disclosed method and apparatus.

FIG. 2 is an illustration of a sectional view taken along the line 2-2 in FIG. 1.

FIG. 3 is an illustration similar to FIG. 2, but showing an alternate form of the stringer.

FIG. 4 is an illustration of a perspective view of tooling apparatus used to form a substantially flat charge into the blade stringers shown in FIGS. 1-3.

FIG. 5 is an illustration of a sectional view taken along the line 5-5 in FIG. 6, but showing a charge being formed.

FIG. 6 is an illustration of a sectional view taken along the line 6-6 in FIG. 5.

FIG. 6A is a plan view of a portion of a blade having a pad-up, showing how the die blocks shift to conform to the contours of the blade during the forming process.

FIGS. 27-43 are diagrammatic illustrations of the tooling apparatus shown in FIG. 4, respectively showing the sequential steps of the fabrication method shown in FIG. 26.

DETAILED DESCRIPTION

Figure 7:
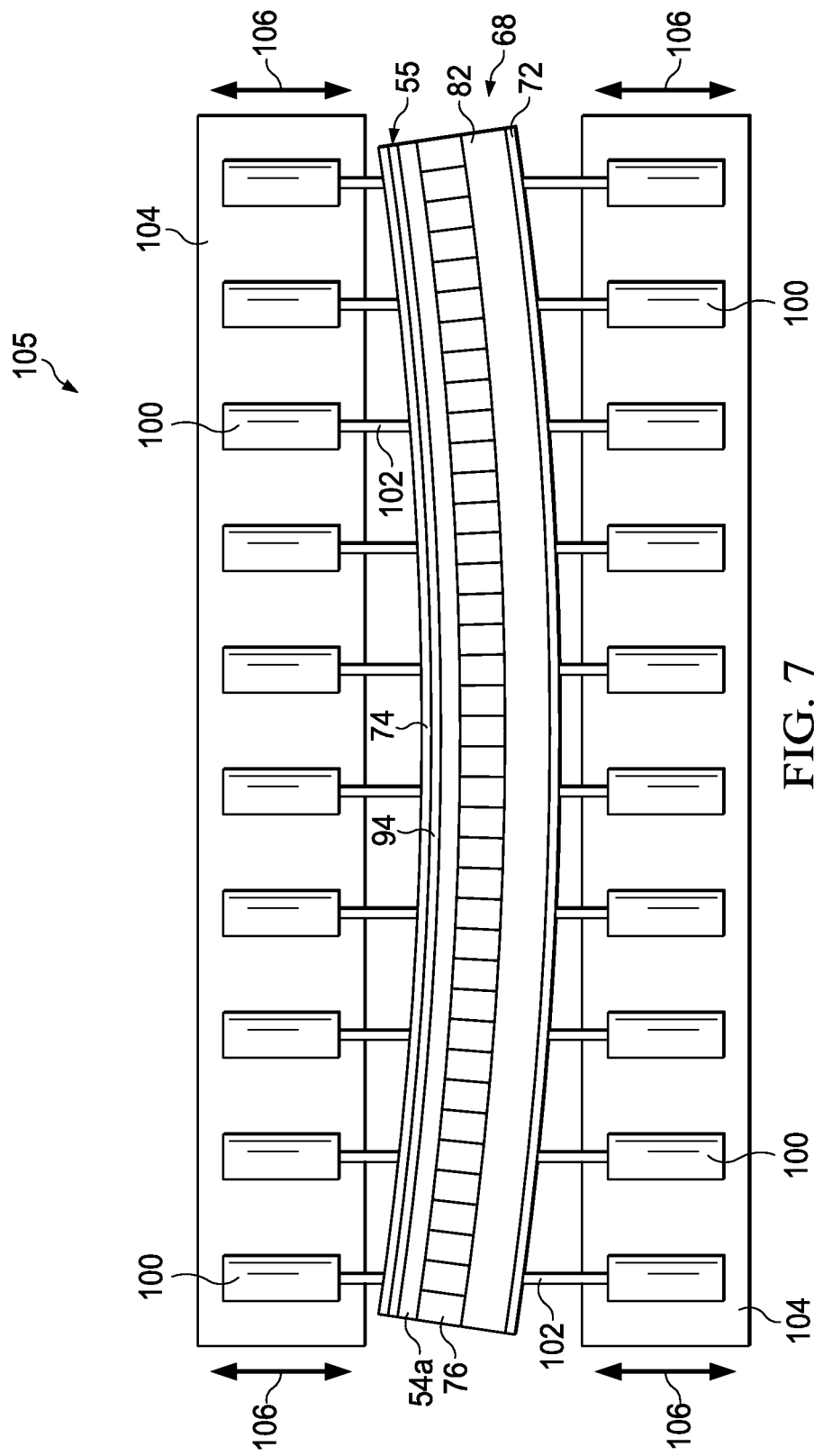
FIG. 7 is an illustration of a plan view of a die and punch contour changing mechanism employing the tooling apparatus shown in FIG. 4.

Referring first to FIGS. 1 and 2, the disclosed embodiments relate to a method and apparatus for fabricating an elongate, composite stiffener, such as a blade type stringer 50 having a substantially flat blade 52 and a flange 54 extending substantially perpendicular to the blade 52. The flange 54 includes a pair of flange portions 54a laterally extending from one end of the blade 52, and connected to the blade 52 by a radius section 60. The blade stringer 50 may have one or more contours 58 along its length. In the illustrated embodiment, the stringer 50 has a substantially constant contour 58 in the curved plane 56 of a flange 54. In other embodiments, the stringer 50 may have one or more of the contours 58 which may or may not be of constant curvature. Also, as will be discussed later in more detail, the flange 54 may have a variable gauge or thickness $T_1$ at one or more locations along its length in order to conform the stringer 50 to localized contours of a structure to which it is attached, such as an aircraft skin 61. Also, the thickness $T_2$ and/or a height H of the blade 52 may vary along the length of the stringer 50.

The disclosed method and apparatus may be used to fabricate other configurations of blade-type stringers 50, such hybrid-I stringer 50a shown in FIG. 3. Stringer 50a comprises a blade 52 having an angularly shaped outer end 62, and a flange 54. The blade end 62 includes a triangularly shaped, composite filler 64, however other filler shapes are possible. The flange 54 includes a V-shaped groove 57 at the intersection of flange portions 54a with the blade 52. The groove 57 is filled with a composite filler 66 having a triangularly shaped cross section substantially matching that of the groove 57. Each of the fillers 64, 66 may comprise an adhesive that may or may not be reinforced with fibers, or alternatively, may comprise strips (not shown) of prepreg tape.

FIGS. 4-6 illustrate tooling apparatus 68 that may be employed to form the stringers shown in FIGS. 1-3 using a single, substantially flat, multi-ply composite charge 55. The charge may comprise multiple plies 59 of composite material, such as, without limitation, a carbon fiber epoxy prepreg, and may include pad-up plies 98 to conform the flange 54 (FIG. 2) of the stringer 50 to local contours, such as local contours of the skin 61. The tooling apparatus 68 broadly comprises a lower die 70, an upper punch 88 and a pair of flexible plates 72, 74, upon which the die 70 and punch 88 are respectively mounted. Die 70 comprises a pair of die portions 70a, 70b which are spaced apart to form a die cavity 86 and are slideable, substantially laterally, toward and away from each other on plate 72. Each of the die portions 70a, 70b is segmented at 75 and comprises a plurality of die blocks 76 which, in the illustrated example have a generally rectangular cross section, however other cross sectional shapes are possible.

The die blocks 76 are aligned in side-by-side relationship along the length of the plates 72, 74 and are joined together by flexible connectors 78 which may comprise, for example and without limitation, a flexible metal strap. The die blocks 76 are mounted on plate 72 and are interconnected by connectors 78 such that their respective axes remain neutral during the forming and contouring of the charge 55. The die blocks 76 may comprise any suitable, relatively rigid material, such as wood, metal, ceramic or a composite, and include inner forming surfaces 76a and upper forming surfaces 76b. A pair of L-shape, elongate brackets 82 are mounted on the plate 72, on opposite sides of die 70, and function to both retain the die blocks 76 on the plates 72 as well as react lateral forming forces generated by the die blocks 76. A pair of inflatable hoses 84, sometimes referred to as bags or bladders, are sandwiched between the brackets 82 and the die blocks 76, which are adapted to be coupled with a suitable source of pressurized air (not shown). The hoses 84 may be selectively pressurized in order to apply a lateral force on the die blocks 76 during forming and/or contouring operations. Other mechanisms, however, may be provided to apply lateral force to the die blocks 76.

The punch 88 is substantially flat and includes slits 90 that segment the punch 88 into a plurality of punch portions 92 that allow the punch 88 to flex along its length in a plane (not shown) that is substantially perpendicular to the plane 56 (FIGS. 1 and 2) of the flange 54. The punch 88 may be formed of any suitable rigid material, such as metal, ceramic or a composite.

As previously mentioned, the stringer 50 may have a variable flange thickness $T_1$ in localized areas along its length in order to conform the stringer 50 to local contours of the skin 61 (FIG. 1). In order to accommodate these thickness variations so that constant pressure is applied to the charge 55 in these localized areas, suitable contoured lower and upper shims 80, 94 respectively may be provided. For example, as shown in FIGS. 4 and 6, the charge 55 may include pad-up plies 98 in the area of the flange portions 54a (FIG. 2). In order to assure that substantially even forming pressure is applied over the area of the pad-up plies 98, the upper shims 94 includes a contour 96 that substantially conforms to the cross sectional shape of the pad-up plies 98. Although not shown in the Figures, the lower shims 80 may also contain one or more contours along their lengths beneath the die blocks 76 in order to accommodate thickness variations in the flange portions 54a of the stringer 50. Also, the lower shim 80 may be tapered (not shown) in the area beneath the die cavity 86 (FIG. 4) in order to alter the blade height along its length. The shims 80, 94 may be formed of any substantially non-compressible material that will transmit force to the charge 55, yet is flexible to the degree necessary to allow the shims 80, 94 to bend during contouring of the tooling apparatus 68.

Referring to FIG. 6A, as previously mentioned, the thickness $T_2$ of the stringer blade 52 may vary along its length. For example, the blade 52 may have local pad-ups 97 which increase the blade thickness $T_2$. During the forming process, the die blocks 76 in the area 99 of the pad-up 97 slide 101 laterally outward on the lower plate 72, so as to conform to the contour presented by the pad-up 97, and maintain substantially constant forming pressure on blade 52.

FIG. 7 illustrates a die and punch contour changing mechanism 105 incorporating the tooling apparatus 68 shown in FIGS. 4-6. The die and punch contour changing mechanism 105 may comprise, for example and without limitation, a press 105. A plurality of individual, spaced apart actuators 100 are respectively mounted on opposing press plates 104 which are adapted for movement toward and away from each other, as shown by the arrows 106. The tooling apparatus 68 is disposed between the press plates 104. The press plates 104 may be coupled with suitable power operated mechanisms such as cylinder actuators (not shown) for displacing the press plates 104, which open and close the tooling apparatus 68 during a charge forming operation. Each of the actuators 100 includes a plunger 102 coupled with one of the plates 72, 74 that applies a force to the plates 72, 74, in order to bend the plates 72, 74 which in turn longitudinally contours the tooling apparatus 68, and thus the formed charge 55. Other mechanisms may be employed to longitudinally contour the tooling apparatus 68 such as that disclosed in U.S. Patent Publication 20100102482 published Apr. 29, 2010, the entire disclosure of which is incorporated by reference herein.

Figure 8:
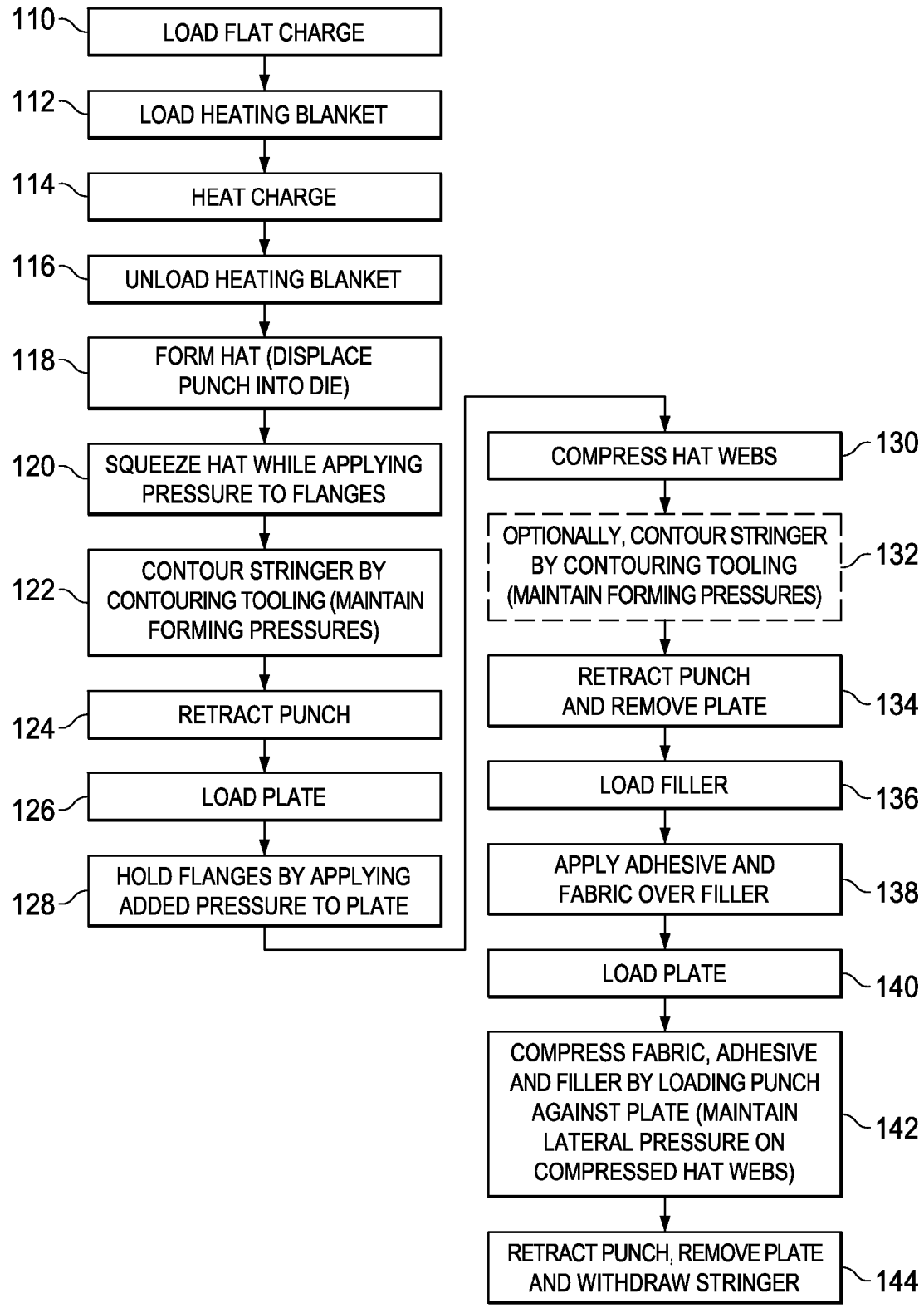
FIG. 8 is an illustration of a flow diagram of a method of fabricating the contoured blade stringer shown in FIGS. 1 and 2.
Figure 10:
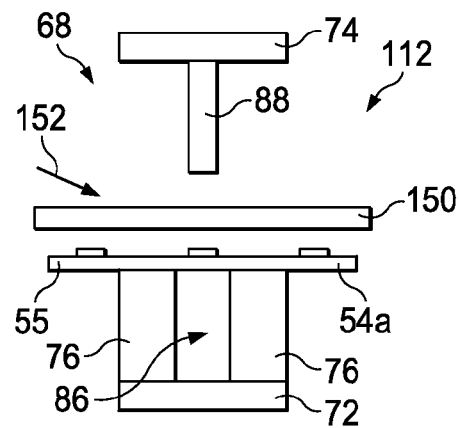
Figure 11:
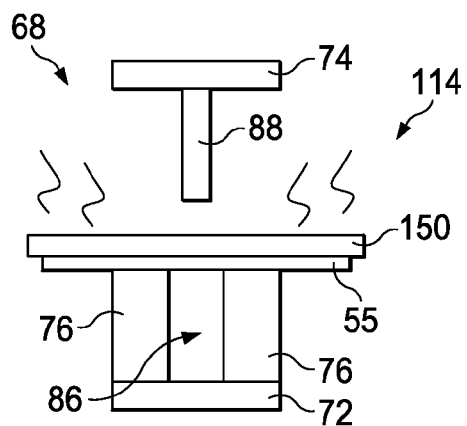
Figure 12:
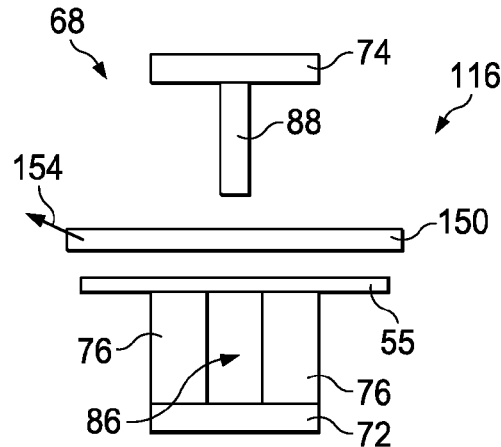
Figure 13:
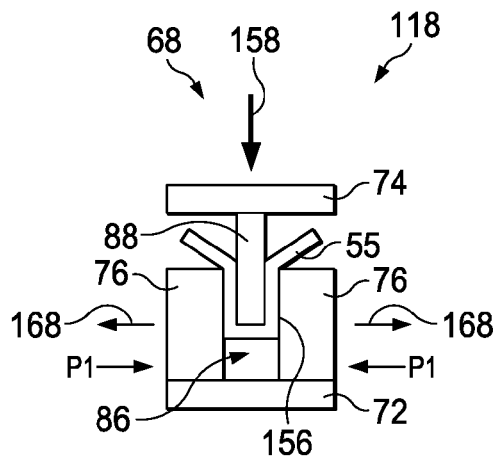

Attention is now directed to FIG. 8 which describes the individual steps of a method of fabricating contoured blade stringers; these steps are also sequentially shown, in diagrammatic form, in FIGS. 9-25. Beginning at step 110, a substantially flat, multi-ply composite charge 55 is loaded 146 onto the die blocks 76 (FIG. 9), with punch 88 in a raised position. A central blade portion 52 of the charge 55 overlies die cavity 86, and the outer flange portions 54a of the charge 55 extend laterally beyond the die blocks 76. Strips of adhesive 148 may be placed on the charge 55, either before or after the charge 55 is loaded onto the die blocks 76. Next, as shown at 112 in FIG. 8, a heating blanket 150 (FIG. 10) is loaded 152 onto the charge 55. Next, at 114, the charge is heated (FIG. 11) using the heating blanket 150, thereby softening the charge 55 to a suitable forming temperature. Other types of heating devices may be used to heat the charge 55, including but not limited to radiant and inductive type heaters (not shown). At step 116, the heating blanket 150 is unloaded at 154, as shown in FIG. 12. At step 118, a blade portion 52 of the charge 55 is formed into a hat 156 (FIG. 13) by forcing 158 the punch 88 into the die cavity 86. As the hat 156 is being formed as shown in FIG. 13, a first intermediate level of pressure P1 is applied to the die blocks 76 by the hoses 82 in order to maintain the die blocks 76 loaded against the charge 55. However this intermediate level of pressure P1 is less than the laterally outward pressure developed by the punch 88, consequentially although loaded against the hat 156, the die blocks 76 move laterally outwardly 168 until the hat section 156 is fully formed within the cavity 86.

Next, at step 120, while laterally inward pressure P1 is maintained against the hat 156 by the die blocks 76 (FIG. 14), the top plate 74 applies pressure 164 to the flange portions 54a, forming the latter down against the die blocks 76. Optionally, at step 122, the partially formed charge 55 is contoured (FIG. 15) by contouring 85 the tooling apparatus 68 while laterally inward pressure P1 continues to be maintained on the hat 156 by the die blocks 76. Contouring 85 of the tooling apparatus 68 may be performed by the press shown in FIG. 7 previously described which bends the plates 72, 74 in a plane (not shown) that is substantially parallel to the plane 56 of the flange 54 (see FIGS. 1 and 2). As plates 72, 74 are bent into a desired curvature, both the punch 88 and the die 78 flex and conform to the curvature of the plates 72, 74. As previously described in connection with FIGS. 4-6, the upper and lower shims 80, 94 maintain substantially constant forming pressure on the flange portions 54a as the tooling apparatus 68 is being contoured 85 to the desired shape.

Figure 16:
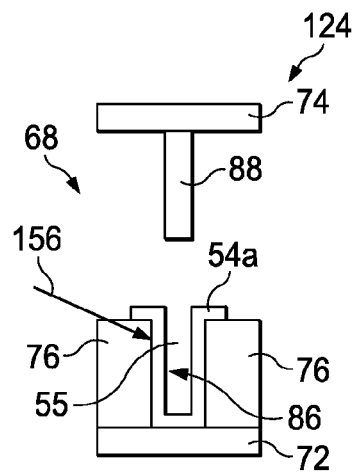
Figure 17:
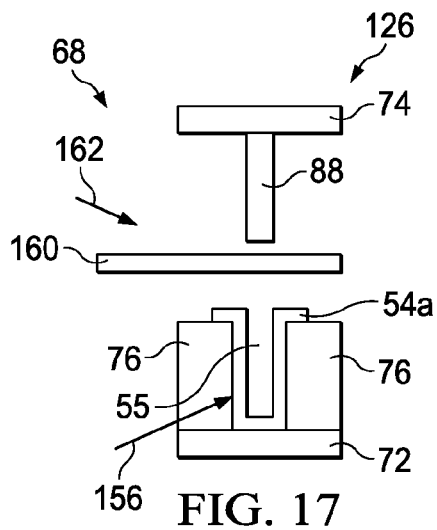
Figure 18:
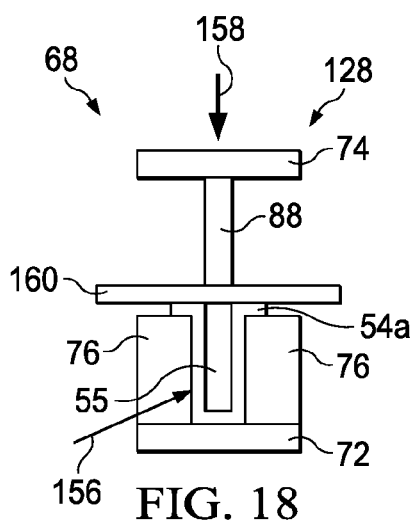

At step 124 in FIG. 8, the punch 88 is retracted from the die cavity 86 (FIG. 16). Next, at step 126, a substantially flat plate 160 (FIG. 17) is loaded 162 onto the flange portions 54a. At step 128, the punch 88 is forced 158 (FIG. 18) into contact with the plate 160, thereby loading the plate 160 against the flange portions 54a, thereby immobilizing the flange portions 54a. Next, at step 130, while the flange portions 54a are held in place against the die blocks 76 by the force applied by the plate 160 and the punch 88, pressure P2 (FIG. 19) is applied to the die blocks 76 by the hoses 84 which squeeze the hat 156 into a blade 52. The pressure P2 is a forming pressure that is greater than pressure P1 applied to the die blocks 76 during steps 118-122.

Figure 21:
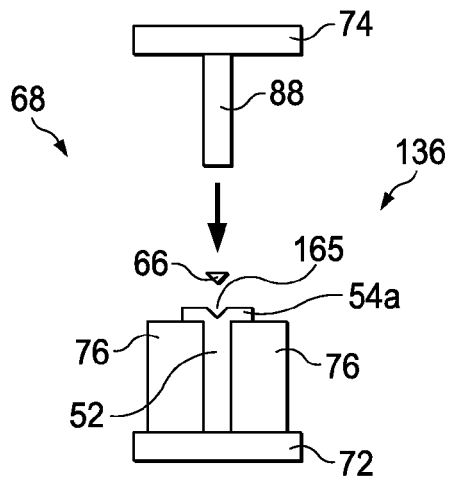
Figure 22:
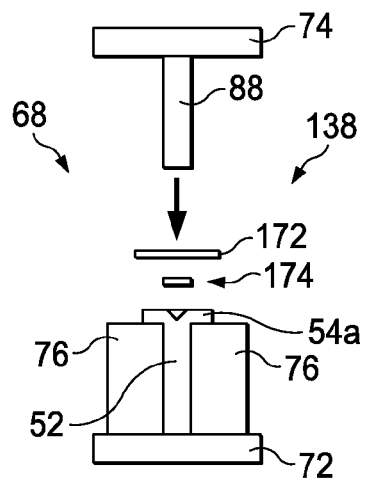
Figure 23:
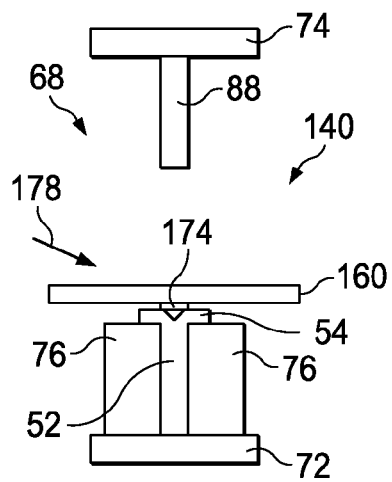
Figure 24:
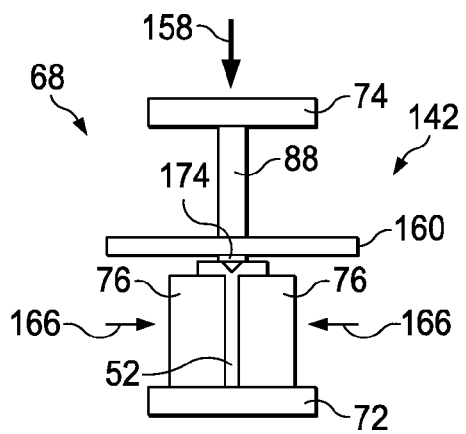
Figure 25:
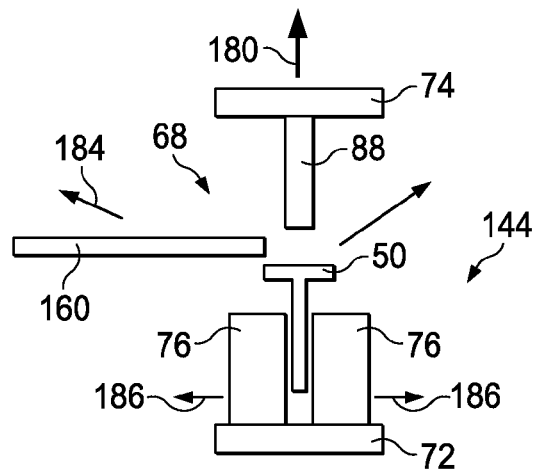

At step 134 shown in FIG. 8, the punch 88 is retracted 180 (FIG. 20), and the plate 160 is removed 167 leaving a V-shaped groove 165 between the flange portions 54a. At step 136 shown in FIG. 8, a composite filler 66 is placed in the groove 165, as shown in FIG. 21. Next, at step 138, a strip of adhesive 174 (FIG. 22) and a layer of fabric 172 are placed over the filler 66. At step 140, plate 160 is reloaded, overlying the flange 54 (FIG. 23). Then, as shown in step 142, the fabric layer 172, adhesive strip 174 and the filler 66 are compressed by displacing the punch downwardly as shown in FIG. 24 into contact with plate 160. Finally, at step 144, and is shown in FIG. 25, the punch 88 is retracted 180, the plate 160 is removed 184, allowing the fully formed blade stringer 50 to be withdrawn from the tooling apparatus 68.

Figure 15:
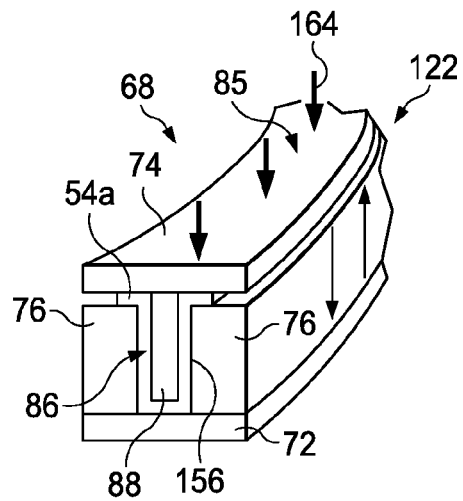

It should be noted here that in the method embodiment just described, contouring of the tooling apparatus 68 is performed when the charge 55 is in a partially formed state as shown in FIG. 15. Alternatively, however, the charge 55 may be contoured at step 132, after the hat 156 has been compressed into the blade 52 shown in FIG. 19. Contouring of the tooling apparatus 68 is optional and not required when using the tooling apparatus 68 to form substantially straight stringers (not shown). When stringer contouring is not required, it is not necessary to perform steps 122-132. In either case, the disclosed method may advantageously allow ply slippage during the forming and/or contouring processes which may reduce ply wrinkling and result in finished parts that have superior characteristics and/or exhibit improved performance. Furthermore, in another embodiment, contouring of the charge 55 along its length is performed after the blade portion 52 is formed, but prior to forming the flange portions 54a onto the die blocks 76. The filler 66 is placed in the groove 165 after the flange portions 54a have been formed on the contoured blade portion 52. This latter mentioned method embodiment may facilitate the contouring process, particularly where more highly contoured stringers 50 are being fabricated, resulting in improved part quality with less wrinkling and/or easier contouring of the charge 55.

Figure 26:
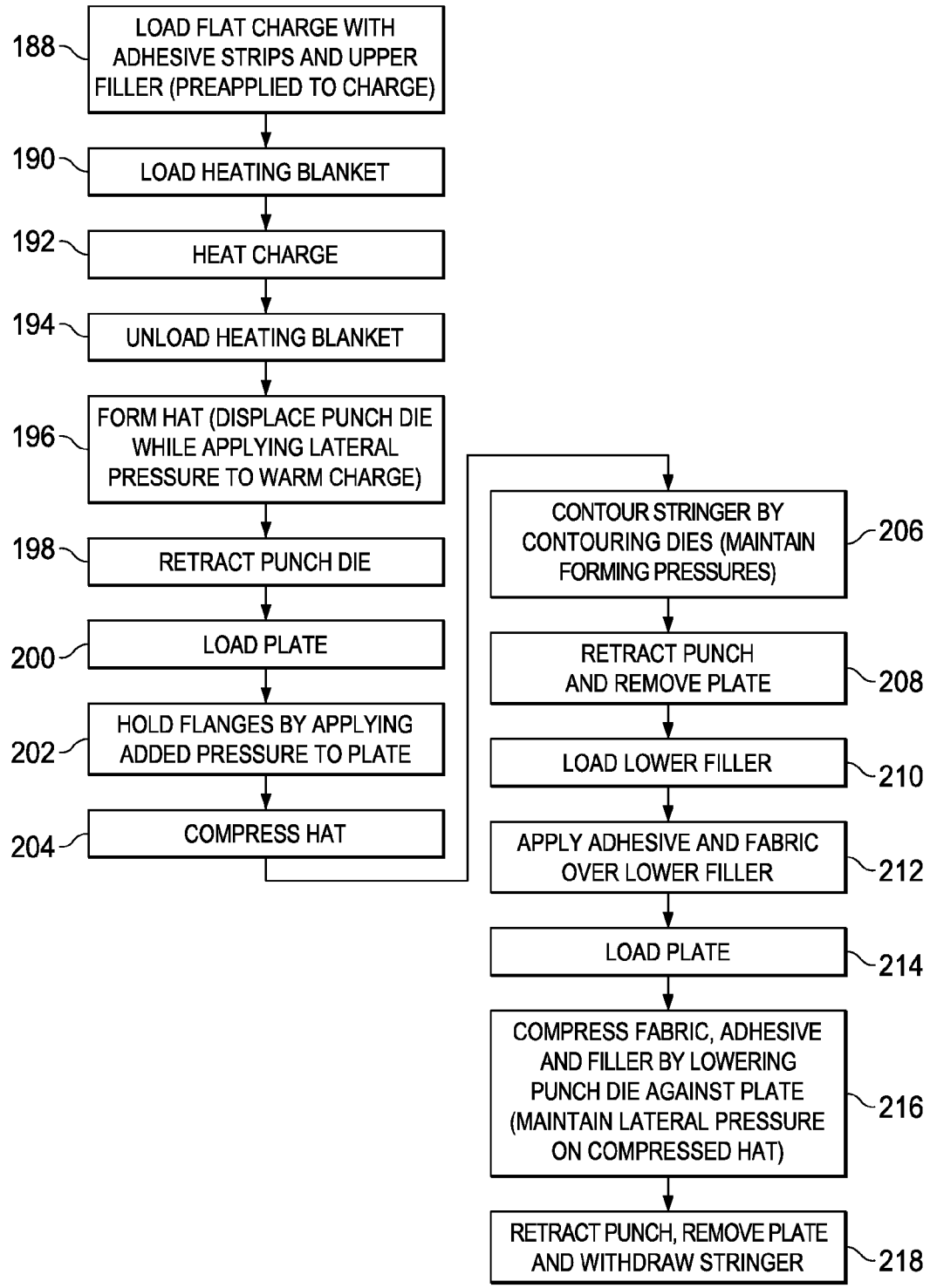
FIG. 26 is an illustration of a flow diagram of a method of fabricating the contoured blade stringer shown in FIG. 3.
Figure 33:
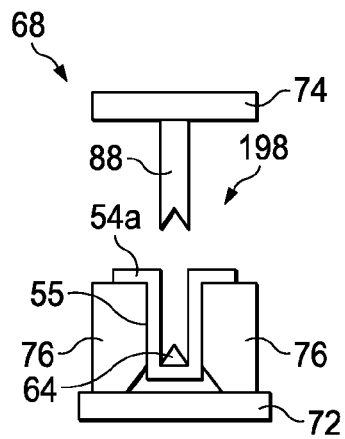
Figure 34:
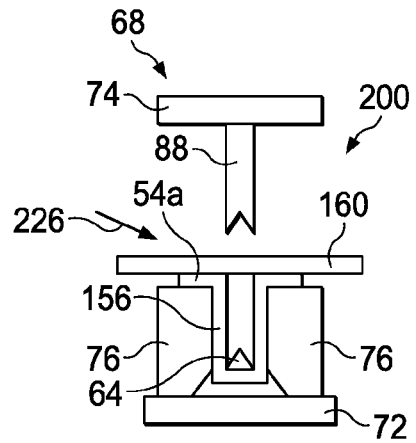
Figure 35:
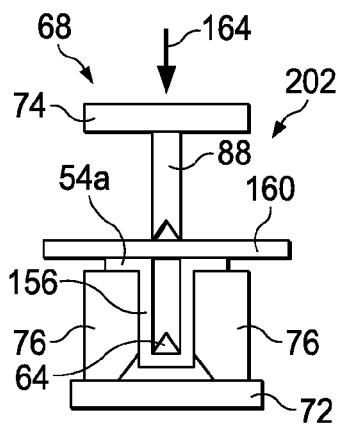
Figure 36:
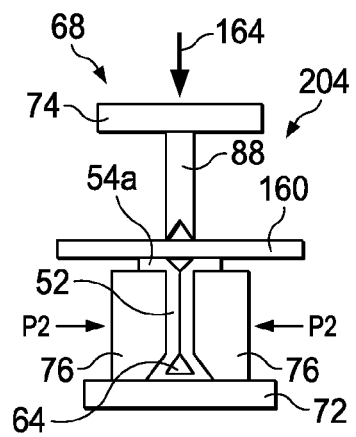

Attention is now directed to FIG. 26, along with related FIGS. 27-43 which illustrate steps of a method of fabricating a hybrid type blade stringer 50a, such as that shown in FIG. 3. As can be seen from FIGS. 27-43, the tooling apparatus 68 use to fabricate the stringer 50a shown in FIG. 3 is substantially similar to that previously described, with two exceptions. Specifically, as shown in FIG. 27, the end of the punch 88 includes a generally V-shaped groove 88a along the length of the punch 88 which substantially matches the size and shape of a triangular filler 64. Additionally, each of the die blocks 78 includes a bevel or chamfer 155 along a bottom edge which assists in forming the angularly shaped outer end 62 of the blade 52 shown in FIG. 3.

Referring now to FIG. 26, at step 188 a substantially flat composite charge 55 (FIG. 27) is loaded 220 onto the die blocks 76. Strips of adhesive 148 may be applied to the charge 55, following which the upper filler 64 is placed over the central adhesive strip 148. Next, at 190, a heating blanket 150 (FIG. 28) is loaded 222 onto the charge 55. At step 192 in FIG. 26, the blanket 150 is used to heat the charge 55 (FIG. 29) to a suitable forming temperature. At step 194 in FIG. 26 the blanket 150 is unloaded 224, as shown in FIG. 30. At step 196 the punch 88 is displaced downwardly into the die cavity 86 (FIG. 31) to form the charge 55 into a hat 156. As the punch 88 continues to move downwardly through the cavity 86, the upper plate 74 comes into contact with the flange portions 54a, and forms the latter down against the die blocks 76. During step 196, lateral pressure P1 is applied to the die blocks 76 by the inflatable hoses 82 (see FIGS. 4 and 5).

At step 198, the punch 88 is retracted (FIG. 33) and at step 200, a substantially flat plate 160 (FIG. 34) is loaded 226 onto the flange portions 54a of the partially formed charge 55. At step 202, the punch 88 is loaded against the plate 160 (FIG. 35) which applies pressure to the flange portions 54a to hold them against the die blocks 76. At 204, lateral pressure P2 is applied (FIG. 36) by the hoses 84 to the die blocks 76, causing the die blocks 76 to compress the hat 156 (FIG. 35) into a blade 52.

Figure 37:
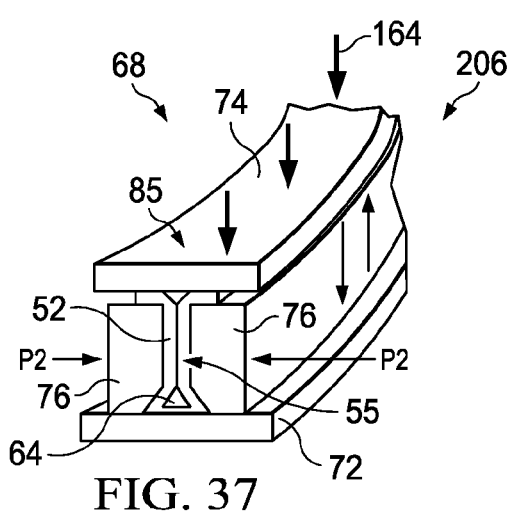
Figure 38:
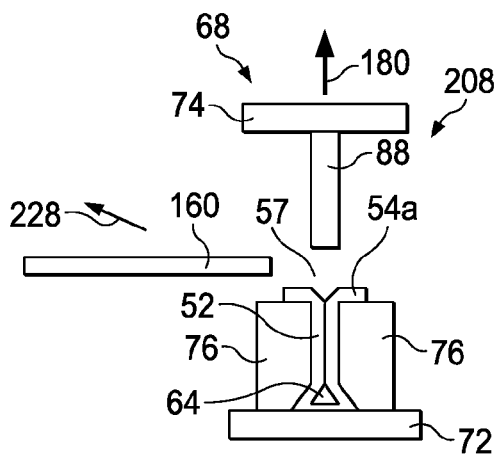
Figure 39:
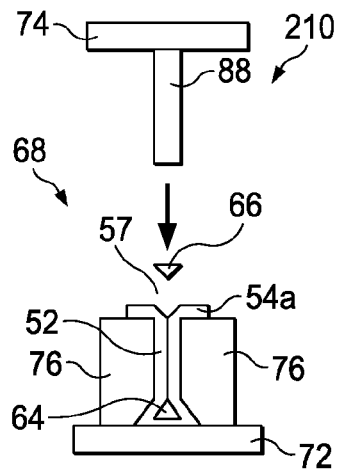
Figure 40:
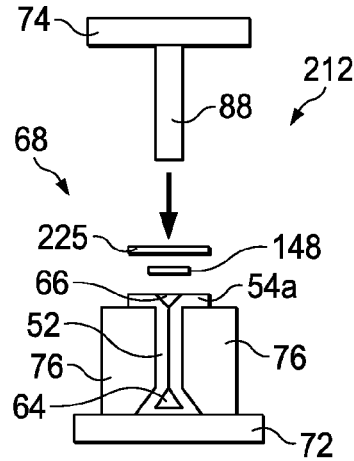

Next, at step 206 and as shown in FIG. 37, the punch 88 is removed the plate 74 and formed stringer 52 may be optionally contoured 85 by contouring the tooling apparatus 68 using a press such as that shown in FIG. 7 which applies a pressure 164 to the plates 72, 74 to bend the plates 72 74 to the desired contour. During the contouring 85 of the tooling apparatus 68 in step 206, lateral inward pressure P2 is maintained on the die blocks 76 by the hoses 84.

Figure 41:
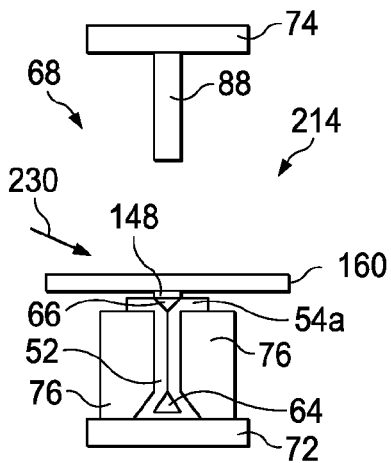
Figure 42:
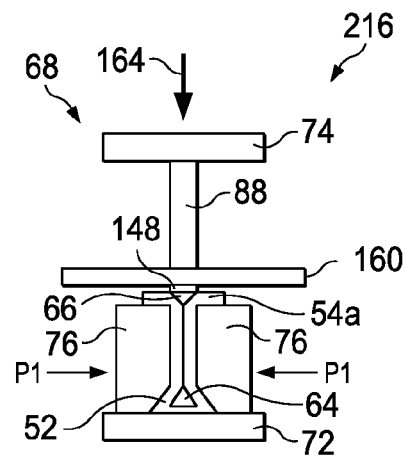
Figure 43:
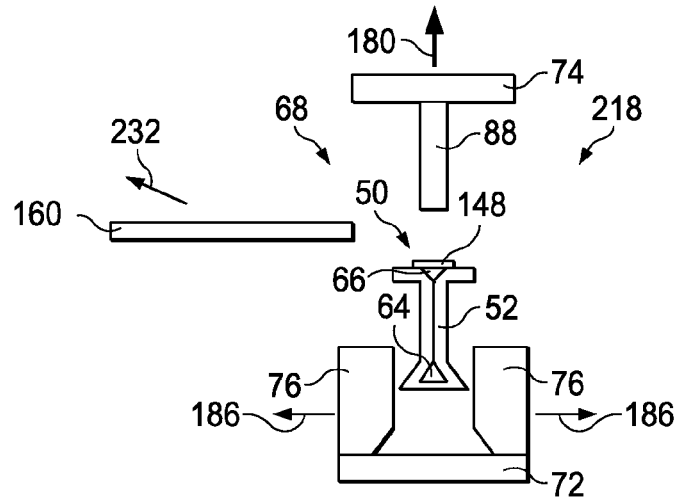

Following contouring of the stringer 52 at step 206, the punch 88 is retracted 180 as shown at 208, and the plate 160 is removed 228. At step 210 in FIG. 26, a lower filler 66 (FIG. 39) is loaded into the groove 165 between the flange portions 54a. Next, as shown in step 212 in FIG. 26, a strip of adhesive 148 and a layer of fabric 225 is placed over the filler 66 (see FIG. 30). As shown in step 214 in FIG. 26, the plate 160 is reloaded 230 onto the flange portions 54a (FIG. 41). At 216, the punch 88 is displaced downwardly into contact with the plate 160 which compresses the fabric layer 225 and adhesive 148 against the filler 66. During step 216, pressure P1 is maintained on the die blocks 76. Finally, at step 218 in FIG. 26, the punch 88 is retracted 180 (FIG. 43), the plate 160 is removed 232 and the completed stringer 52 is withdrawn from the tooling apparatus 68.

As previously mentioned, contouring of the tooling apparatus 68 is optional when carrying out the method shown in FIGS. 26-43, and is not required when using the tooling apparatus 68 to form substantially straight stringers (not shown) having the hybrid-I shape shown in FIG. 3. When stringer contouring is not required, it is not necessary to perform steps 198-206. In the embodiment described in connection with FIGS. 27-43, contouring of the blade portion 52 is performed after the flange portions 54a have been formed. Alternately, however, it may be preferable in other embodiments to form the flange portions 54a after the blade portions 52 have been formed, following which the upper filler 66 may be installed. By contouring the charge 55 before the flange portions 54a have been formed, the contouring process may be easier and/or part quality may be improved.

Figure 44:
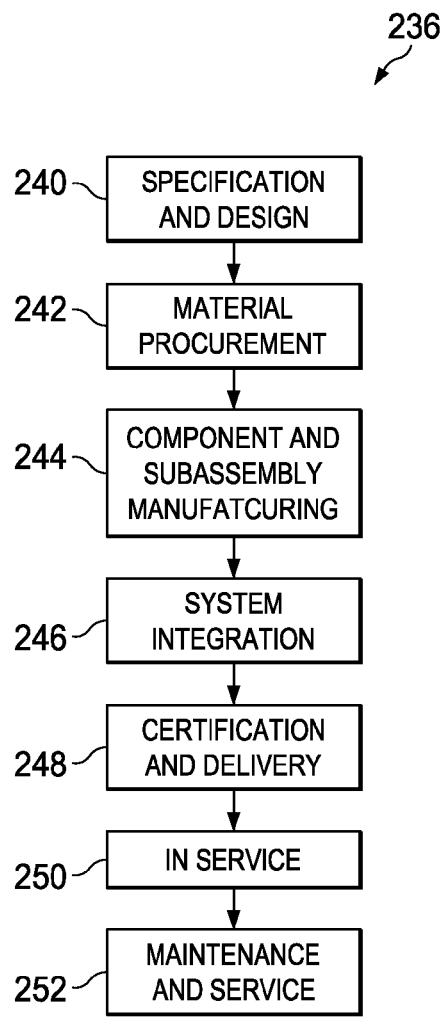
FIG. 44 is an illustration of a flow diagram of aircraft production and service methodology.
Figure 45:
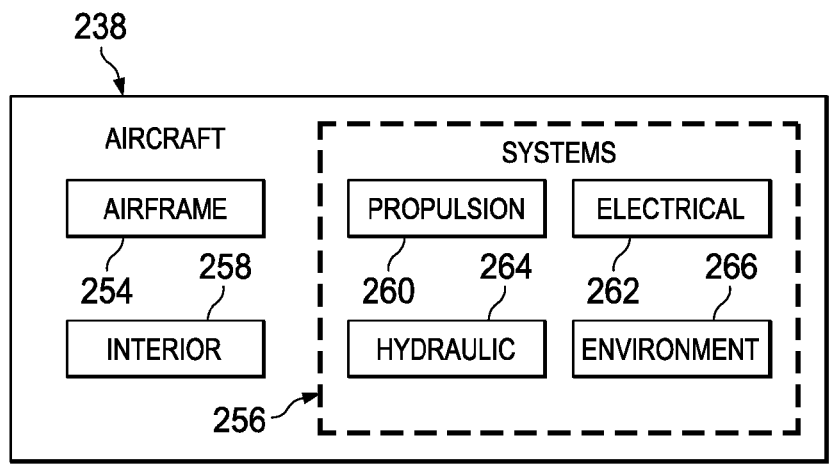
FIG. 45 is an illustration of a block diagram of an aircraft.

Embodiments of the disclosure may find use in a variety of potential applications, particularly in the transportation industry, including for example, aerospace, marine, automotive applications and other application where automated layup equipment may be used. Thus, referring now to FIGS. 44 and 45, embodiments of the disclosure may be used in the context of an aircraft manufacturing and service method 236 as shown in FIG. 44 and an aircraft 238 as shown in FIG. 45. Aircraft applications of the disclosed embodiments may include, for example, without limitation, layup of stiffener members such as, without limitation spars and stringers. During pre-production, exemplary method 236 may include specification and design 240 of the aircraft 238 and material procurement 242. During production, component and subassembly manufacturing 244 and system integration 246 of the aircraft 238 takes place. Thereafter, the aircraft 238 may go through certification and delivery 248 in order to be placed in service 250. While in service by a customer, the aircraft 238 is scheduled for routine maintenance and service 250, which may also include modification, reconfiguration, refurbishment, and so on.

Each of the processes of method 236 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 45, the aircraft 238 produced by exemplary method 236 may include an airframe 254 with a plurality of systems 256 and an interior 258. Examples of high-level systems 256 include one or more of a propulsion system 260, an electrical system 262, a hydraulic system 264, and an environmental system 266. Any number of other systems may be included. Although an aerospace example is shown, the principles of the disclosure may be applied to other industries, such as the marine and automotive industries.

Systems and methods embodied herein may be employed during any one or more of the stages of the production and service method 236. For example, components or subassemblies corresponding to production process 244 may be fabricated or manufactured in a manner similar to components or subassemblies produced while the aircraft 238 is in service. Also, one or more apparatus embodiments, method embodiments, or a combination thereof may be utilized during the production stages 244 and 246, for example, by substantially expediting assembly of or reducing the cost of an aircraft 238. Similarly, one or more of apparatus embodiments, method embodiments, or a combination thereof may be utilized while the aircraft 238 is in service, for example and without limitation, to maintenance and service 252.

Figure 46:
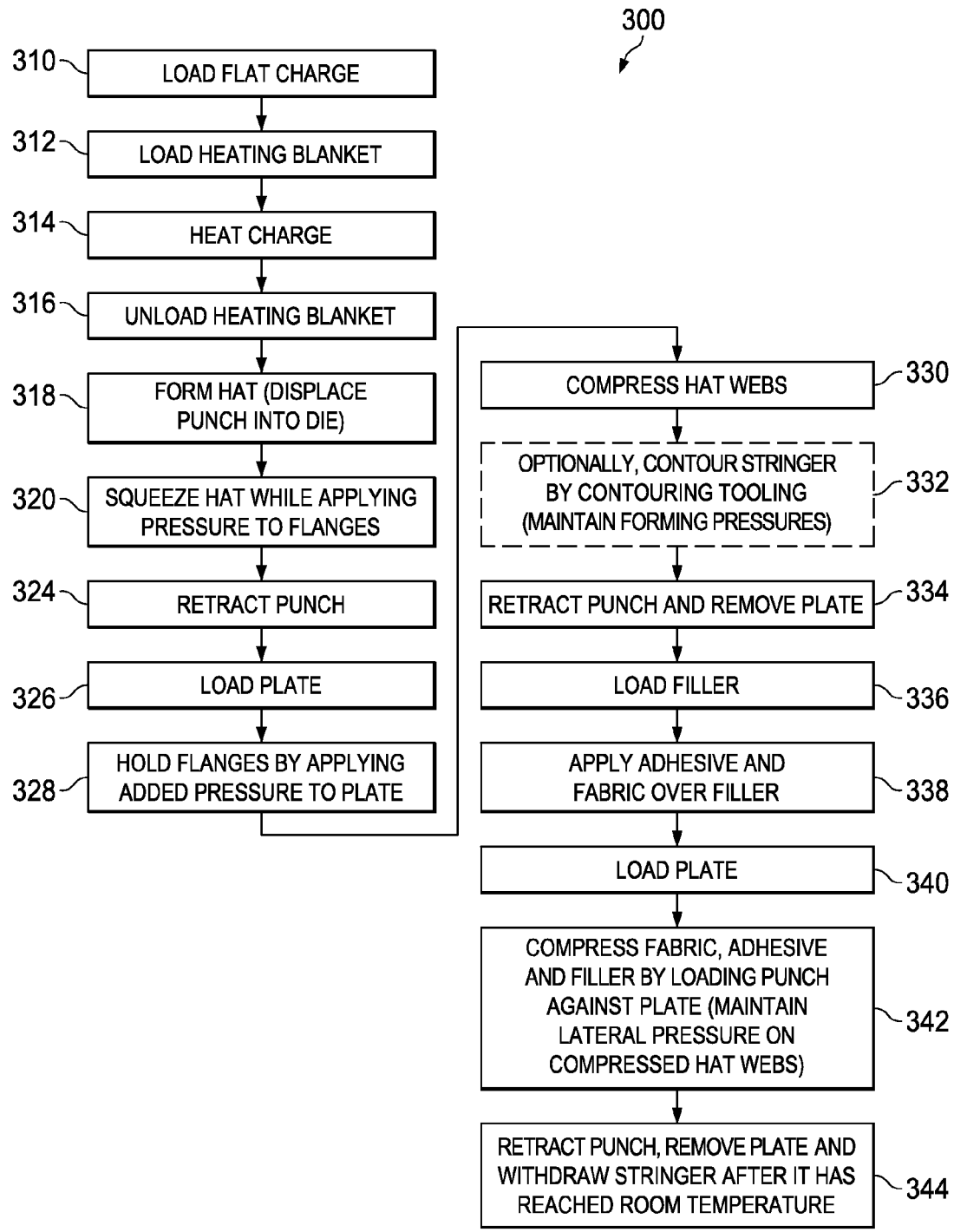
FIG. 46 is a flowchart of a method for fabricating the contoured blade stringer shown in FIGS. 1 and 2, according to an advantageous embodiment.

Attention is now directed to FIG. 46. FIG. 46 is a flowchart of a method for fabricating the contoured blade stringer shown in FIGS. 1 and 2, according to an advantageous embodiment. Thus, FIG. 46 describes a method of fabricating contoured blade stringers. These steps are also sequentially shown, in diagrammatic form, in FIGS. 9-25. Method 300 further includes additional material.

Figure 9:
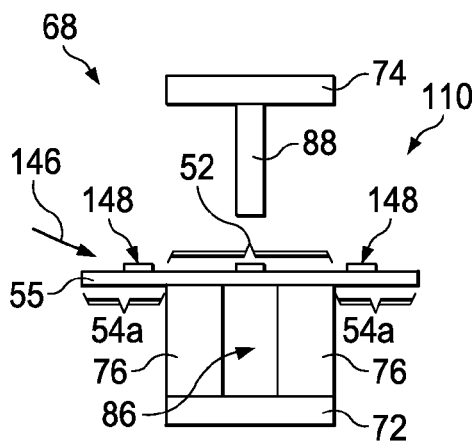
FIGS. 9-25 are diagrammatic illustrations of the tooling apparatus shown in FIG. 4, respectively showing the sequential steps of the fabrication method shown in FIG. 8.

Method 300 may begin with loading a flat charge (operation 310). For example, a substantially flat, multi-ply composite charge 55 is loaded 146 onto the die blocks 76, as shown in FIG. 9, with punch 88 in a raised position. A central blade portion 52 of charge 55 may overlie die cavity 86, and the outer flange portions 54a of charge 55 may extend laterally beyond die blocks 76. Strips of adhesive 148 may be placed on charge 55, either before or after charge 55 is loaded onto die blocks 76.

Next, a heating blanket is loaded (operation 312). For example, heating blanket 150 of FIG. 10 may be loaded 152 onto charge 55.

Next, the charge is heated (operation 314). For example, charge 55 of FIG. 11 may be heated using heating blanket 150, thereby softening charge 55 to a suitable forming temperature. Other types of heating devices may be used to heat charge 55, including but not limited to radiant and inductive type heaters (not shown).

Next, the heating blanket is unloaded (operation 316). For example, heating blanket 150 of FIG. 12 may be unloaded at 154.

Then, the hat is formed and the punch is displaced into the die (operation 318). For instance, blade portion 52 of charge 55 may be formed into hat 156 of FIG. 13 by forcing 158 punch 88 into die cavity 86. As hat 156 is being formed, a first intermediate level of pressure P1 is applied to die blocks 76 by hoses 84 in order to maintain die blocks 76 loaded against charge 55. However this intermediate level of pressure P1 is less than the laterally outward pressure developed by punch 88, consequentially although loaded against hat 156, die blocks 76 may move laterally outward 168 until hat section 156 is fully formed within die cavity 86.

Figure 14:
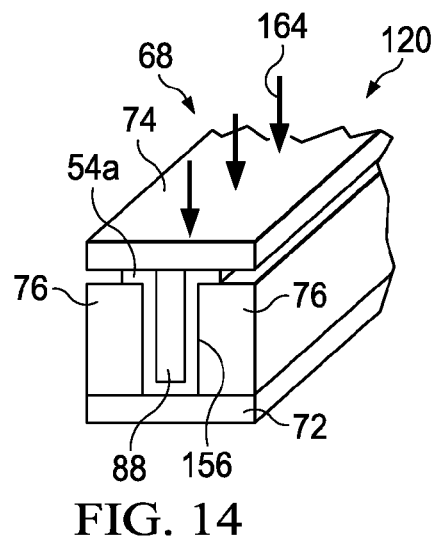

Next, the hat is squeezed while pressure is applied to the flanges (operation 320). For example, while laterally inward pressure P1 of FIG. 14 is maintained against hat 156 by die blocks 76, the top plate 74 may apply pressure 164 to flange portions 54a, forming flange portions 54a against the die blocks 76.

Next, the punch is retracted (operation 324). For example, punch 88 may be retracted from the die cavity 86 of FIG. 16.

Next, the plate is loaded (operation 326). For example, substantially flat plate 160 of FIG. 17 may be loaded 162 onto the flange portions 54a.

Then the flanges are held by applying added pressure to the plate (operation 328). For example, punch 88 of FIG. 18 may be forced 158 into contact with plate 160, thereby loading plate 160 against flange portions 54a and consequently immobilizing flange portions 54a.

Figure 19:
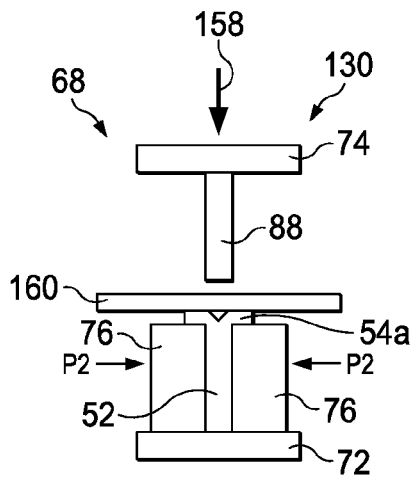
Figure 20:
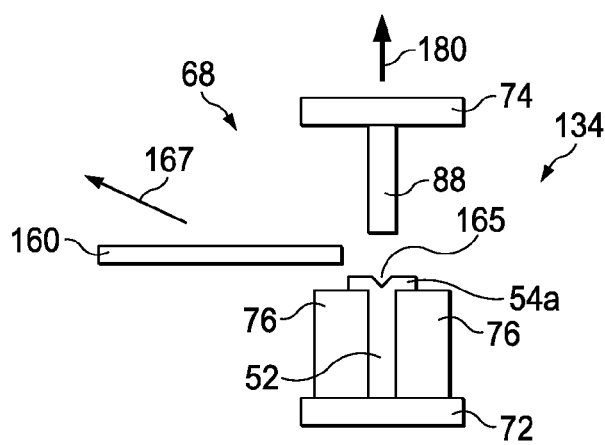

Next, the hat webs are compressed (operation 330). For example, while the flange portions 54a of FIG. 19 are held in place against the die blocks 76 by the force applied by plate 160 and punch 88, pressure P2 may be applied to die blocks 76 by hoses 84 which squeeze hat 156 into a blade 52. The pressure P2 is a forming pressure that is greater than pressure P1 applied to die blocks 76 during operations 318-320, and optionally, operation 332.

Next, optionally, contour stringer by contouring tooling and maintain forming pressures (operation 332). For instance, partially formed charge 55 of FIG. 15 may be contoured by contouring 85 the tooling apparatus 68 while laterally inward pressure P1 continues to be maintained on hat 156 by die blocks 76. Contouring 85 of tooling apparatus 68 may be performed by the press shown in FIG. 7 previously described which bends plates 72, 74 in a plane (not shown) that is substantially parallel to the plane 56 of the flange 54 (see FIGS. 1 and 2). As plates 72, 74 are bent into a desired curvature, both punch 88 and die 78 flex and conform to the curvature of plates 72, 74. As previously described in connection with FIGS. 4-6, the upper and lower shims 80 and 94 may maintain substantially constant forming pressure on flange portions 54a as tooling apparatus 68 is being contoured 85 to the desired shape.

Next, the punch is retracted and the plate removed (operation 334). For example, punch 88 of FIG. 20 may be retracted 180, and plate 160 removed 167 leaving a V-shaped groove 165 between flange portions 54a.

Next, filler is loaded (operation 336). For instance, composite filler 66 of FIG. 21 may be placed in groove 165.

Then, adhesive and fabric is applied over filler (operation 338). For example, strip of adhesive 174 and layer of fabric 172 may be placed over filler 66 of FIG. 22.

Next, the plate is loaded (operation 340). For instance, plate 160 may be reloaded in FIG. 23, overlying flange 54.

Next, the fabric, adhesive, and filler is compressed by loading the punch against the plate and maintaining lateral pressure on the compressed hat webs (operation 342). For example, fabric layer 172, adhesive strip 174, and filler 66 may be compressed in FIG. 24 by displacing the punch downwardly into contact with plate 160.

Finally, the punch is retracted, the plate is removed, and stringer withdrawn after it has reached room temperature (operation 344). For example, punch 88 of FIG. 25 may be retracted 180 and plate 160 may be removed 184, allowing the fully formed blade stringer 50 to be withdrawn from tooling apparatus 68 after it has reached room temperature.

Allowing the stringer 50 to cool down to room temperature while being constrained, before withdrawing the stringer 50 from the tooling apparatus 68, is important because this eliminates the formation of horizontal wrinkles for contoured stringers. By not performing this step, horizontal wrinkles may form in the web for contoured stringers. As used by those of ordinary skill in the art, and as used in the description herein, "a web" refers to the blade portion of the stringer. The blade of a stringer generally includes two flanges and a web, with the web being the portion of the blade that is basically vertical and the flanges resting on the skin and being basically horizontal.

Method 300, described above in detail, involves contouring of the tooling apparatus 68 when the charge 55 is in a partially formed state as shown in FIG. 15. Alternatively, however, the charge 55 may be contoured such as, for example, at operation 332 of method 300, after hat 156 of FIG. 19 has been compressed into blade 52. Contouring of the tooling apparatus 68 is optional and not be required when using tooling apparatus 68 to form substantially straight stringers (not shown). When stringer contouring is not required, it may not be necessary to perform all the steps of method 300.

In either case, the disclosed method may allow ply slippage during the forming and/or contouring processes, which in turn may reduce ply wrinkling and result in finished parts that have superior characteristics and/or exhibit improved performance. Furthermore, in another embodiment, contouring of charge 55 along its length is performed after blade portion 52 is formed, but prior to forming the flange portions 54a onto the die blocks 76. The filler 66 is placed in the groove 165 after the flange portions 54a have been formed on the contoured blade portion 52. This latter mentioned method embodiment may facilitate the contouring process, particularly where more highly contoured stringers 50 are being fabricated, resulting in improved part quality with less wrinkling and/or easier contouring of the charge 55.

Figure 47:
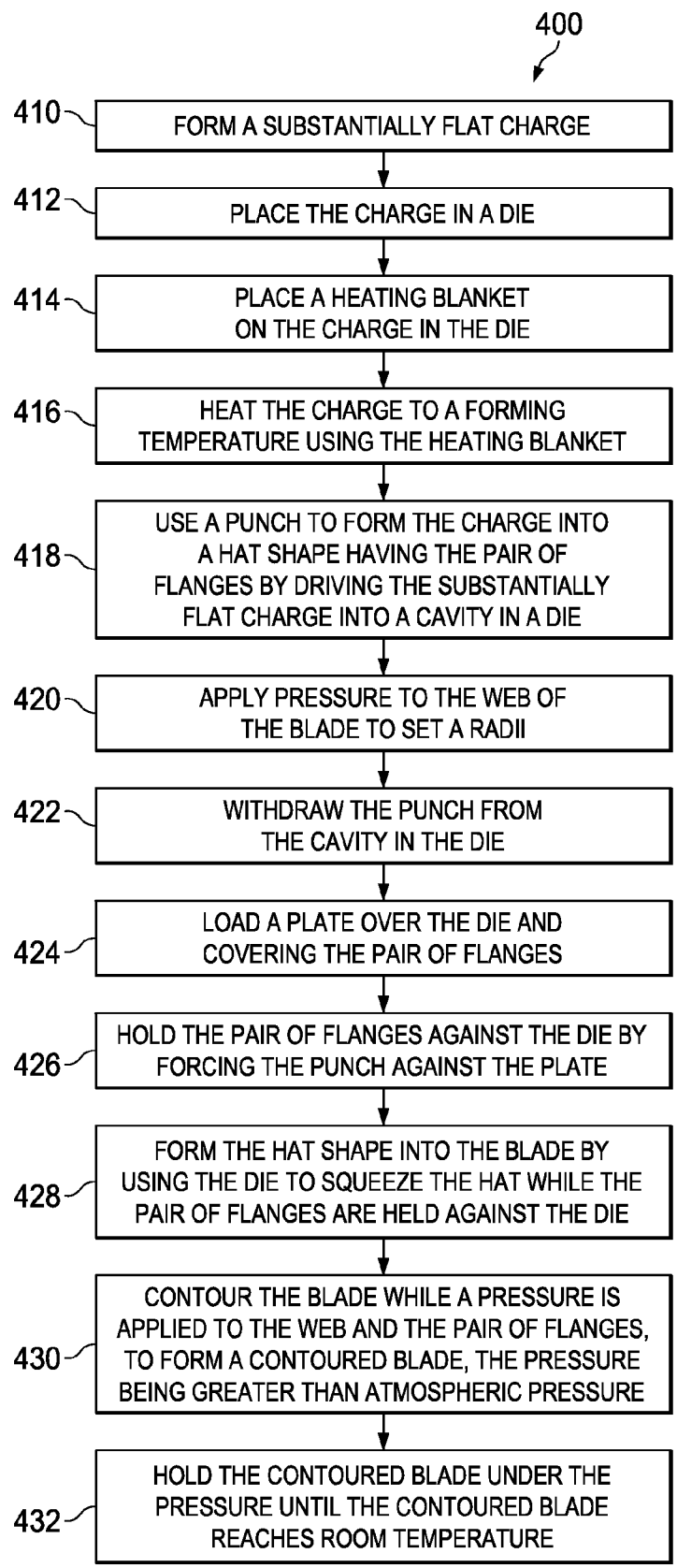
FIG. 47 is a flowchart of a method for fabricating a composite blade stiffener shown in FIGS. 1 and 2, according to an advantageous embodiment.

Attention is now directed to FIG. 47. FIG. 47 is a flowchart of a method of fabricating a composite blade stiffener shown in FIGS. 1 and 2, according to an advantageous embodiment. Thus, FIG. 47 describes a method of fabricating a composite blade stiffener. These steps are also sequentially shown, in diagrammatic form, in FIGS. 9-25. Method 400 further includes additional material.

Method 400 may begin with substantially flat charge being formed (operation 410); followed by the charge being placed in a die (operation 412). Next, a heating blanket may be placed on the charge in the die (operation 414).

The charge may then be heated to a forming temperature using the heating blanket (operation 416). Next, a punch is used to form the charge into a hat shape having the pair of flanges by driving the substantially flat charge into a cavity in a die (operation 418).

Next, pressure is applied to the web of the blade to set a radii (operation 420). For example, the web may be a first portion of the blade which is about vertical relative to the pair of flanges, which are about horizontal to the web of the blade.

Next, the punch is withdrawn from the cavity in the die (operation 422). Then the plate is loaded over the die and the pair of flanges is covered (operation 424). Next, the pair of flanges is held against the die by forcing the punch against the plate (operation 426).

Next, the hat shape is formed into the blade by using the die to squeeze the hat while the pair of flanges is held against the die (operation 428). Then, the blade is contoured while a pressure is applied to the web and the pair of flanges, to form a contoured blade, the pressure being greater than atmospheric pressure (operation 430). Finally, the contoured blade is held under the pressure until the contoured blade reaches room temperature (operation 432).

Figure 48A:
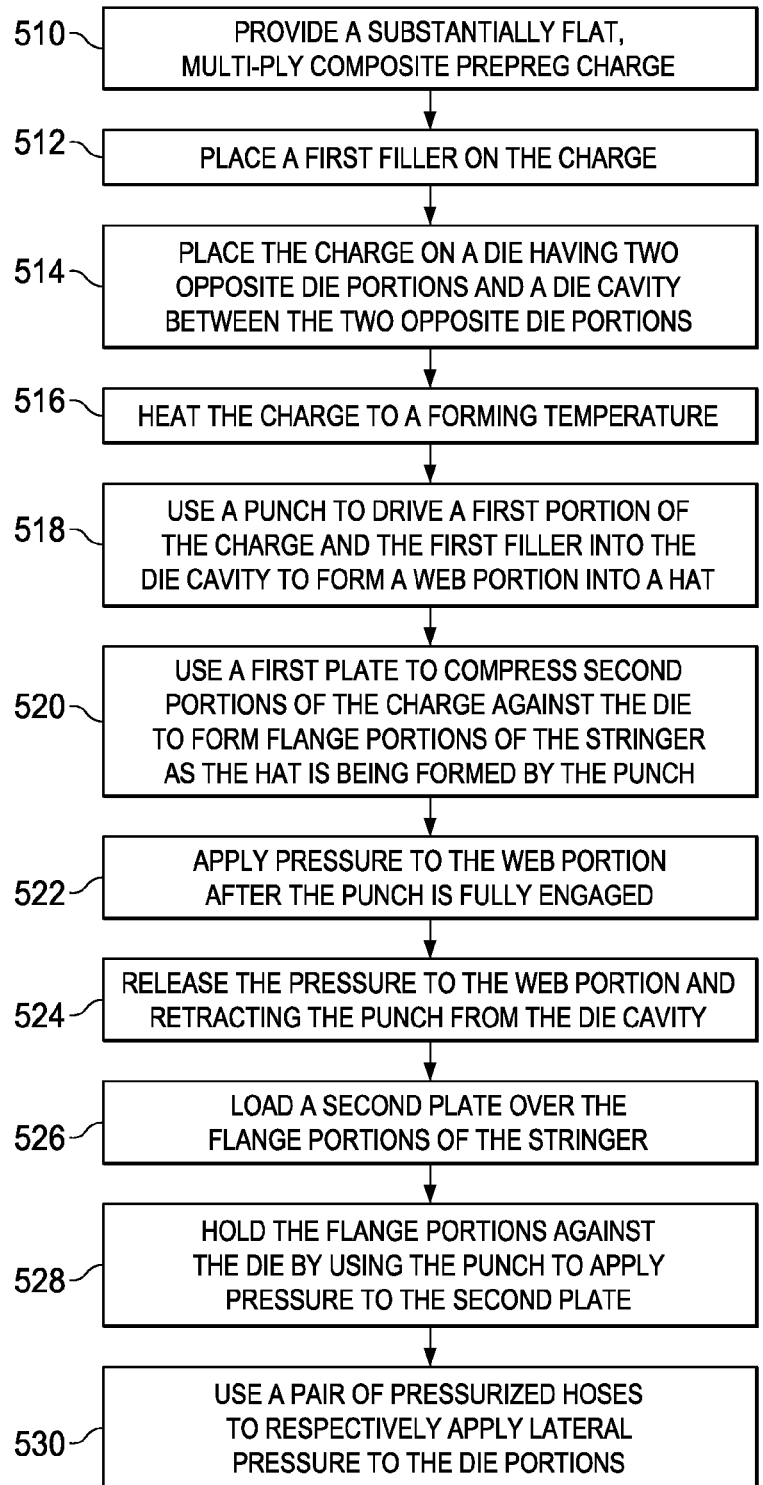
FIGS. 48A-48B are a flowchart of a method for fabricating a composite blade stiffener shown in FIGS. 1 and 3, according to an advantageous embodiment.

Attention is now directed to FIG. 48A. FIG. 48A is a flowchart of a method for fabricating a composite blade stiffener shown in FIGS. 1 and 3, according to an advantageous embodiment. Thus, FIG. 48A describes a method of fabricating a composite blade stiffener. These steps are also sequentially shown, in diagrammatic form, in FIGS. 9-25. Method 500 further includes additional material.

Method 500 may begin with a substantially flat, multi-ply composite prepreg charge being provided (operation 510). Then, a first filler is placed on the charge (operation 512).

Next, the charge is placed on a die having two opposite die portions and a die cavity between the two opposite die portions (operation 514). Then, the charge is heated to a forming temperature (operation 516). Next, using a punch to drive a first portion of the charge and the first filler into the die cavity, a web portion is formed into a hat (operation 518).

Next, a first plate is used to compress second portions of the charge against the die to form flange portions of the stringer as the hat is being formed by the punch (operation 520). Then, pressure is applied to the web portion after the punch is fully engaged (operation 522).

Next, the pressure to the web portion is released and the punch is retracted from the die cavity (operation 524). Then, a second plate is loaded over the flange portions of the stringer (operation 526).

Next, the flange portions are held against the die by using the punch to apply pressure to the second plate (operation 528). Then, a pair of pressurized hoses is used to respectively apply lateral pressure to the die portions (operation 530).

Figure 48B:
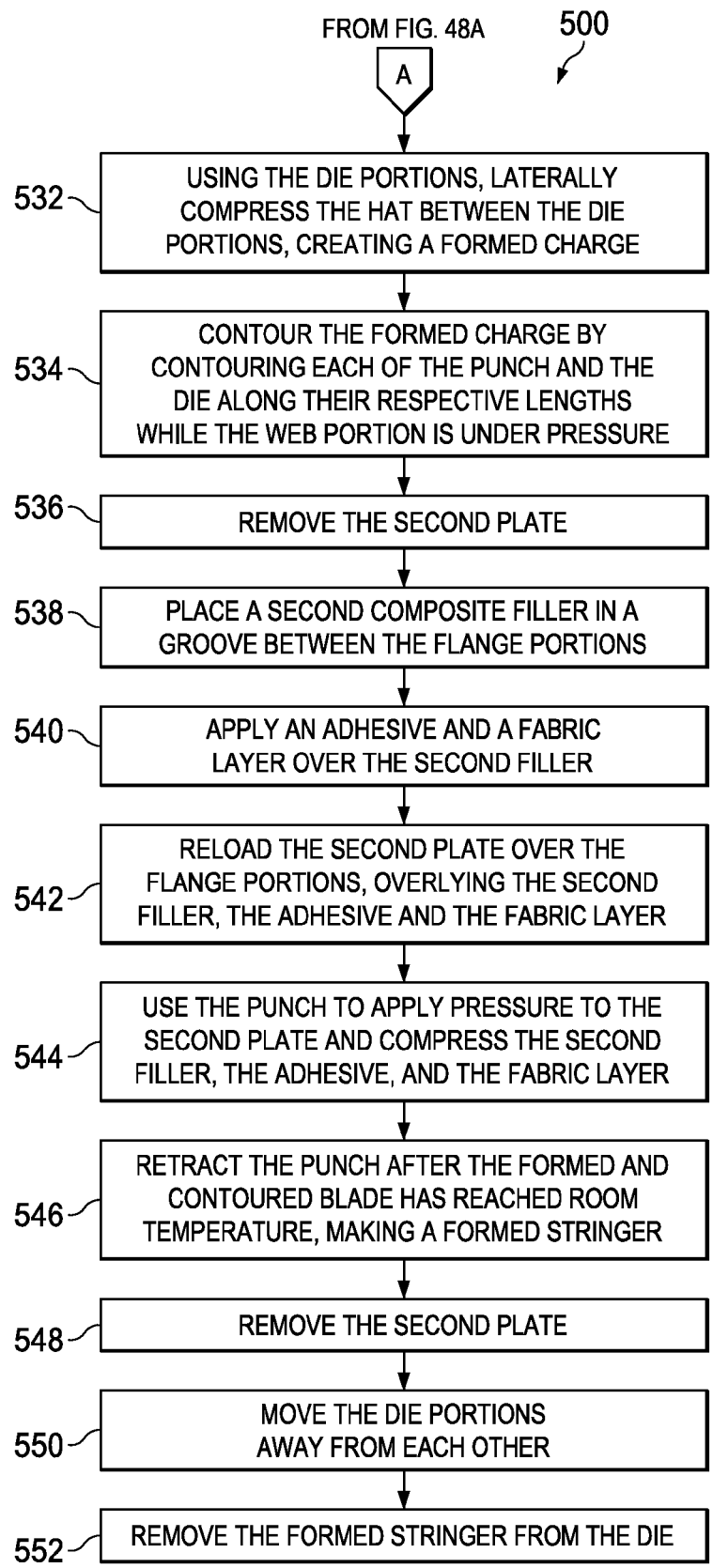

Next, in FIG. 48B, the die portions are used to laterally compress the hat between the die portions, creating a formed charge (operation 532). Then, the formed charge is contoured by contouring each of the punch and the die along their respective lengths while the web portion is under pressure (operation 534).

Next, the second plate is removed (operation 536). Then, a second composite filler is placed in a groove between the flange portions (operation 538).

Then, an adhesive and a fabric layer are applied over the second filler (operation 540). Next, the second plate is reloaded over the flange portions, overlying the second filler, the adhesive, and the fabric layer (operation 542). Then, pressure is applied to the second plate and the punch is used to compress the second filler, the adhesive, and the fabric layer (operation 544).

Next, the punch is retracted after the formed and contoured blade has reached room temperature, making a formed stringer (operation 546). Finally, the second plate is removed (operation 548); the die portions are then moved away from each other (operation 550); and the formed stringer is removed from the die (operation 552).

Figure 49:
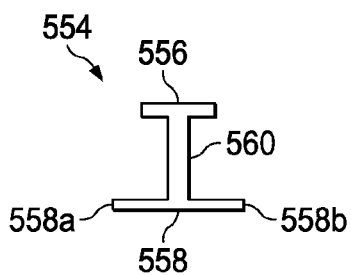
FIG. 49 is an illustration of an end view of an I-stringer.

Attention is now directed to FIG. 49 which illustrates an elongate stiffener having an I-shaped cross-section, hereinafter referred to as an I-stringer 554. The I-stringer 554 comprises a substantially flat base 558 and a substantially flat cap 556 connected by a central web 560. The base 558 is formed by a pair of flanges 558a, 558b which extend laterally outward, in opposite directions. The cap 556 and the base 558 may extend substantially parallel to each other, and generally perpendicular to the web 560. As will be discussed in detail below, the I-stringer 554 is formed from a single, multi-ply composite charge which may or may not have a variable gauge (thickness) along its length. The I-stringer 554 may be straight or may have one or more contours along its length similar to the stiffeners previously described.

FIGS. 50-57 illustrate an apparatus 561 for forming the I-stringer 554 shown in FIG. 49, as well as the sequential steps of a method for forming the I-stringer 554. As will be discussed below in more detail, the forming process uses the apparatus 561 to fold a multi-ply, substantially flat composite charge into a stringer structure having an I-shaped cross section.

Figure 50:
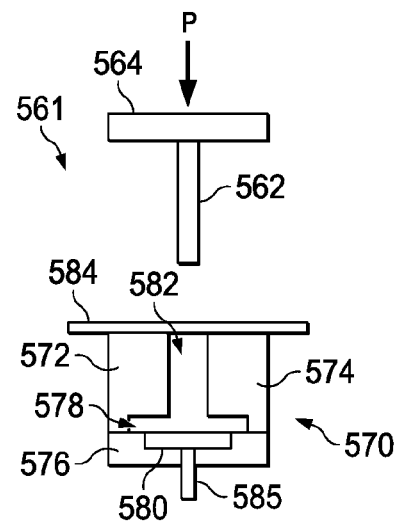
FIG. 50 is an illustration of a cross-sectional view of apparatus for forming a flat composite charge into the I-stringer shown in FIG. 49, the punch being shown in a withdrawn position and a flat composite charged having been placed on the die set.

Referring particularly to FIG. 50, the apparatus 561 comprises a die set 570, upper and lower plates 564, 576 and a conformal, elongate punch 562. The punch 562 is attached to the upper plate 564 which in turn may be coupled to any suitable device such as a press platen (not shown) that applies force to the upper plate 564 and drives the punch 562 into the die set 570. The die set 570 comprises a pair of die portions 572, 574 that are spaced apart from each other to form a die cavity 582 therebetween. The die portions 572, 574 are mounted on the lower plate 576 for lateral movement toward and away from each other. The die set 570 includes a central recess 578 located adjacent to one end of, and communicating with the die cavity 582. A press plate 580 is received within the lower plate 576 and is positioned beneath the recess 578. The press plate 580 is driven by a suitably powered ram 585 to move upwardly into the recess 578 during a later discussed process step for forming the cap 556 within the recess 578 adjacent to one end of the die set cavity 582.

It should be noted here that while the apparatus 561 shown in FIGS. 50-57 (as well as in FIGS. 59-64) is configured to form a substantially straight I-stringer 554 having a constant gauge, the apparatus 561 may be readily adapted to form I-stringers that have a variable gauge or thicknesses and/or one or more contours along their lengths using one or more features of the tooling apparatus previously discussed. For example, the die portions 572, 574 may be segmented along their lengths to allow them to form contours along the length of the I-stringer 554. Similarly, plates 576, 592 may be stepped along their respectively lengths in order to accommodate ply pad-ups which vary the thickness of either the cap 556 and/or the base 558.

Figure 51:
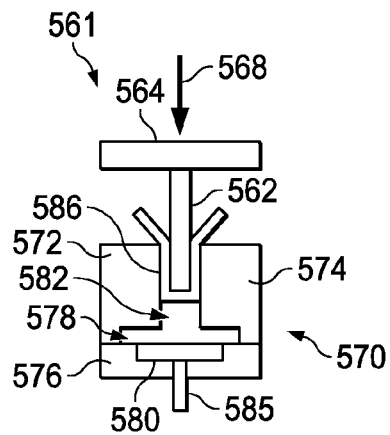
FIG. 51 is illustration similar to FIG. 50 but showing the punch having pressed formed the composite charge partially into the die cavity.
Figure 52:
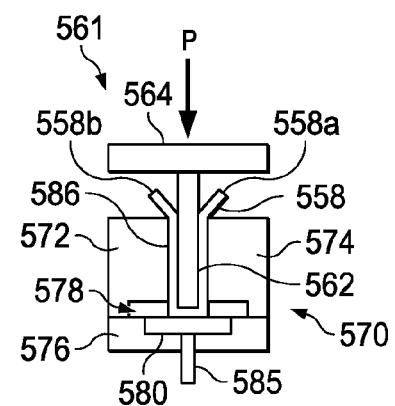
FIG. 52 is an illustration similar to FIG. 51, but showing the punch having fully press formed the composite charge into a stringer hat.

The stringer 554 (FIG. 49) is formed from a single, multi-ply composite charge 584 (FIG. 50) as previously mentioned, using a method that essentially folds the charge into the desired I-cross sectional shape. As shown in FIG. 50, with the punch 562 withdrawn from the die set 570, a substantially flat composite charge 584 is placed and indexed on top of the die set 570, overlying the die cavity 582. The composite charge 584 is then heated to its forming temperature, causing it to soften. Heating of the composite charge 584 may be carried out by placing a heating blanket (not shown) on the composite charge 584, or by using other conventional heating techniques. Next, as shown in FIG. 51, upper plate 564 is displaced downwardly to drive the punch 562 into the die cavity 582, causing the composite charge 584 to be press formed into the die cavity 582. When the punch 562 has reached the bottom of its travel as shown in FIG. 52, the composite charge 584 is fully formed into a stringer hat 586, a bottom portion of which extends into the die set recess 578. At this point, the flanges 558a, 558b of the base 558 have only been partially formed. As used herein, the terms "hat" and "stringer hat" refer to that portion of the composite charge 584 into which the web 560 is ultimately formed, but which, in an intermediate stage of the folding process, has a shape similar to that of a hat or dome, although other shapes are possible.

Figure 53:
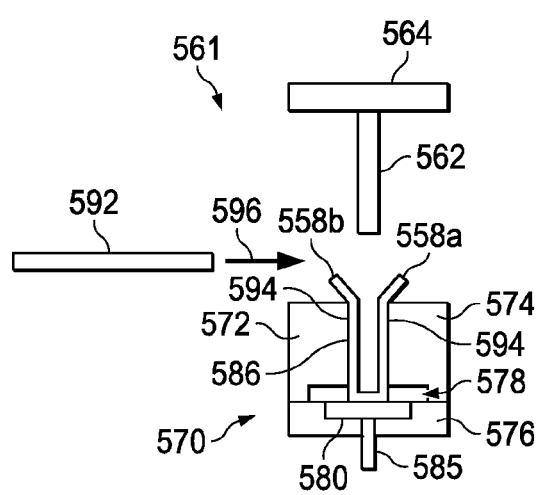
FIG. 53 is an illustration similar to FIG. 52, but showing the punch having been withdrawn and an upper press plate about to be installed on the die set.
Figure 54:
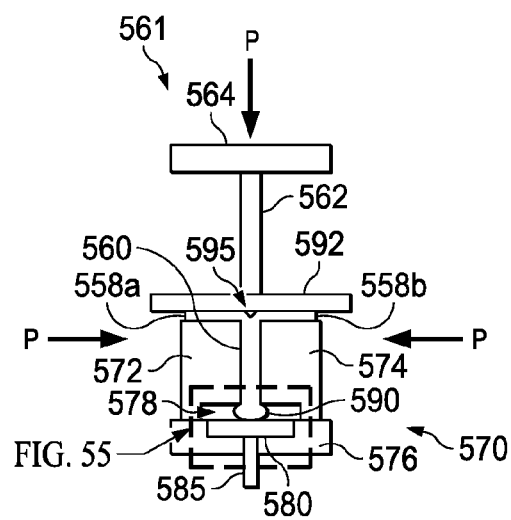
FIG. 54 is an illustration similar to FIG. 53 but showing a later stage of the process in which the stringer hat has been collapsed into a stringer web with a bulb formed on one end thereof.
Figure 55:
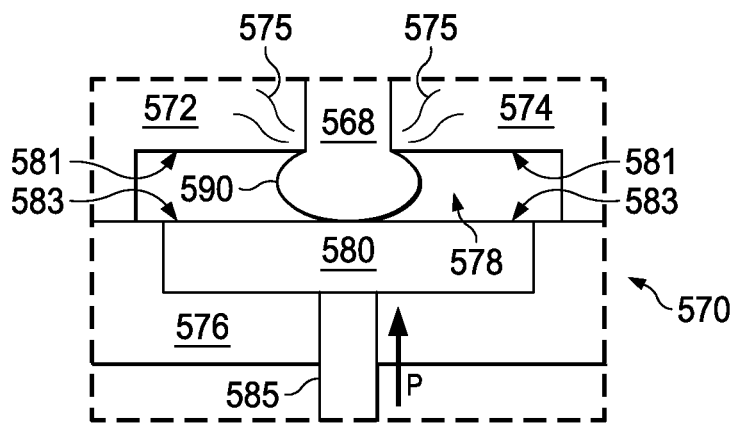
FIG. 55 is an illustration of the area designated as "FIG. 55" in FIG. 54, better showing the bulb formed within a die recess and localized re-heating of the bulb.

Referring to FIG. 53, the punch 562 is then withdrawn and an upper press plate 592 is installed over the die set 570, in readiness to complete press forming of the base flanges 558a, 558b. Next, as shown in FIGS. 54 and 55, the punch 562 is displaced downwardly and applies pressure P to the upper press plate 592, while simultaneously, lateral pressure P is applied to each of the die portions 572, 574. The upper press plate 592 press forms the flanges 558a, 558b down against the die portions 572, 574, to form a substantially flat base 558.

The lateral pressure P applied to the die portions 572, 574 causes the die portions 572, 574 to move toward each other and apply a force to the stringer hat 586 that squeezes the hat 586, causing it to be press formed into a stringer web 560. The lateral force applied by the die portions 572, 574 effectively causes the hat 586 to collapse into the blade-like web 560. Due, however, to the presence of the recess 578 at the bottom of the die set 570, the die portions 572, 574 do not apply lateral pressure to the bottom of the web 560, resulting in a bulb 590 being formed at the bottom of the web 560 within the recess 578.

Figure 56:
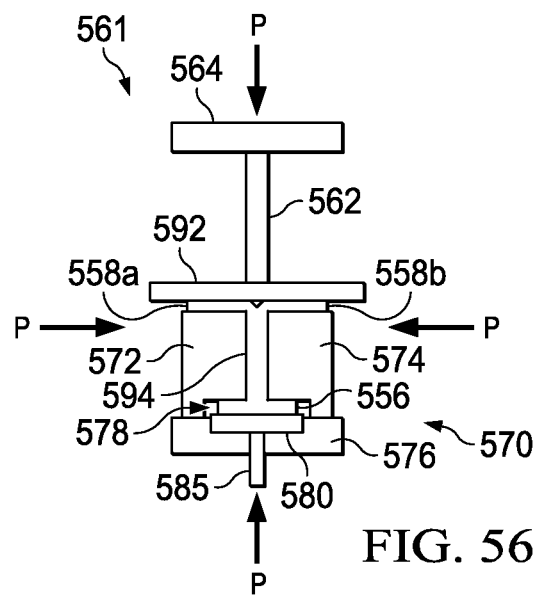
FIG. 56 is an illustration similar to FIG. 54, but showing the bulb having been pressed formed into a flat stringer cap within the die recess.
Figure 57:
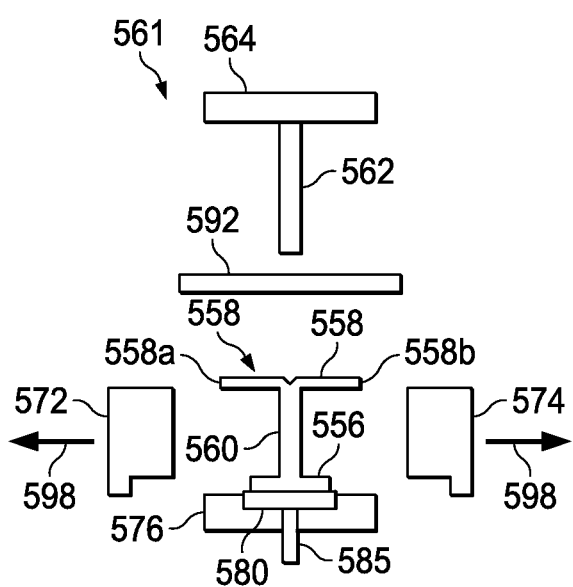
FIG. 57 is an illustration similar to FIG. 56 but showing a later stage of the process in which the apparatus has been disassembled to allow removal of the I-stringer.

With the stringer base 558 and the stringer hat 586 having been fully formed, the next step in the process involves forming the cap 556. Referring now particularly to FIGS. 55 and 56, pressure P applied by the ram 585 is transmitted to the press plate 580, displacing the latter upwardly. The force applied to the bulb 590 by the press plate 580 in a direction substantially perpendicular to the base 558 causes the bulb 590 to be press formed into the recess 578. More particularly, the bulb 590 deforms laterally outward (see FIG. 56) and is formed against parallel flat surfaces 581, 583 (FIG. 55) of the die set 570 and the press plate 580 respectively. In order to fully consolidate the formed I-stringer, the pressure P applied by the die portions 572, 574, the upper press plate 592, and the lower press plate 580 is maintained for a preselected length of time. With the I-stringer 554 having been fully consolidated, then, as shown in FIG. 57, the components of the apparatus 561 are disassembled 598 and the fully formed I-stringer 554 may be removed from the die set 570.

Figure 58:
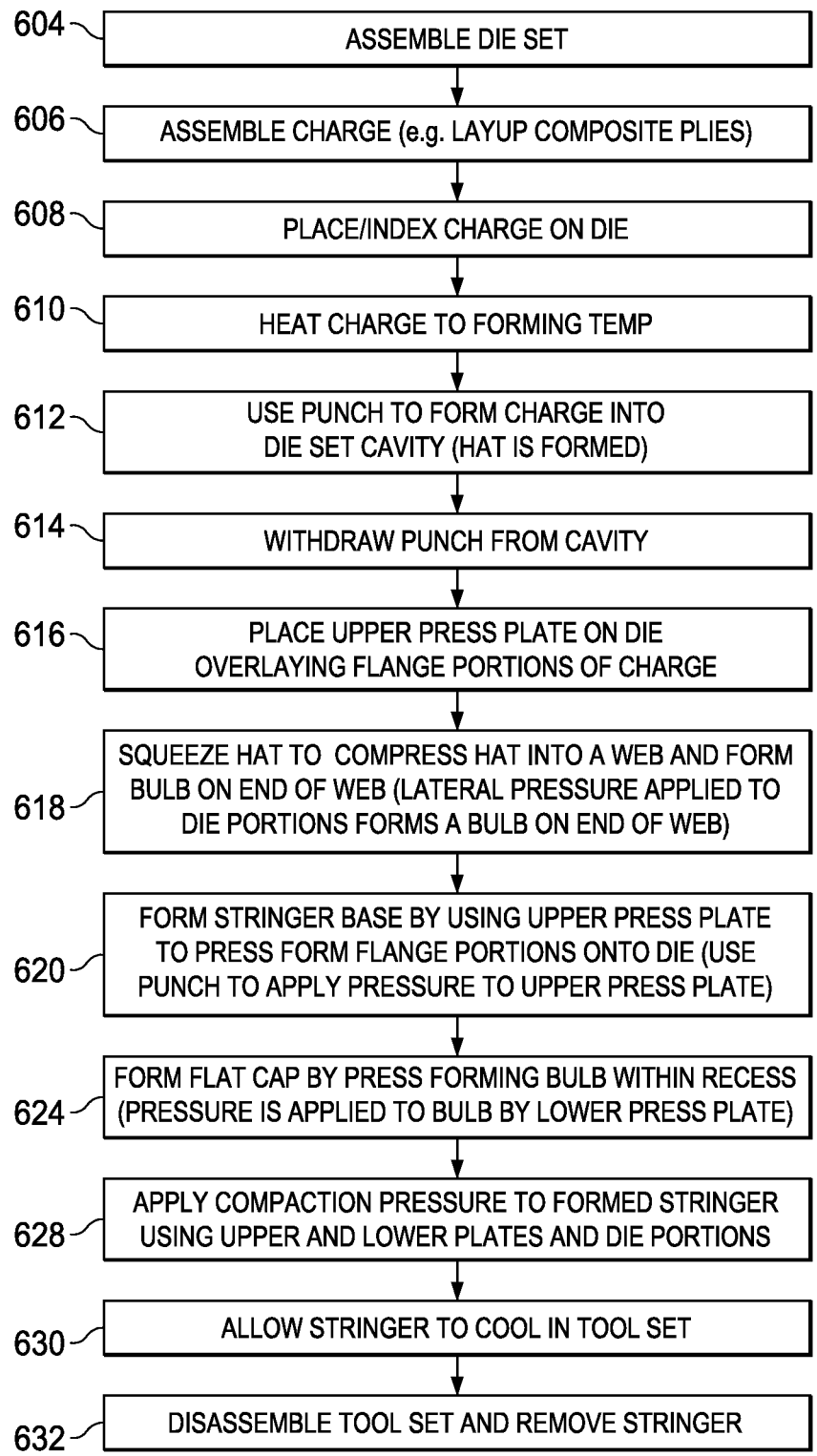
FIG. 58 is an illustration of a flow diagram of a method of fabricating an I-stringer.

FIG. 58 is a flow diagram of the overall steps of the method of forming the I-stringer 554 illustrated in FIGS. 50-57. Beginning at 604, the die set 570 is assembled and at 606, a substantially flat, multi-ply composite charge 584 is assembled. At 608, the composite charge 584 is placed and indexed on the die set 570 (FIG. 50). Next, at 610, the composite charge 584 is heated using any suitable technique such as, without limitation, placing a heating blanket (not shown) on top of the composite charge 584. Heating the composite charge 584 may be achieved using other techniques, such as without limitation, placing the die set 570 in an oven or using infrared lamps. At 612, a punch 562 is used to press form the composite charge 584 into a die cavity 582 (FIGS. 51 and 52), resulting in a stringer hat 586 being formed. At 614, the punch 562 is withdrawn from the die cavity 582, following which, at 616, an upper press plate 592 is placed on the die set 570, overlying flange portions 558 of the charge 584.

Next, at step 618, the stringer hat 586 is squeezed, thereby compressing the hat 586 into a web 560 while forming a bulb 590 on the end of the web (FIGS. 54 and 55). Compression of the stringer hat 586 is achieved by applying lateral pressure to die portions 572, 574. At 620, the stringer base 558 is formed by using the upper press plate 592 to press form flanges 558*a*, 558*b* down onto the die portions 572, 574. The punch 562 may be used to apply the force to the upper press plate 592 necessary to press form of the flanges 558*a*, 558*b*. At 624, the lower press plate 580 driven by a ram 585 is used to press form the bulb 590 within the recess 578.

With the I-stringer 554 having been fully formed, then at 628, compaction pressure is maintained on the I-stringer for a preselected length of time using force applied by the upper and lower plates 592, 580 and die portions 572, 574. Then, at 630, the I-stringer 554 is allowed to cool in the die set 570, following which, the die set 570 may be disassembled and the completed I-stringer 554 may be removed.

Figure 59:
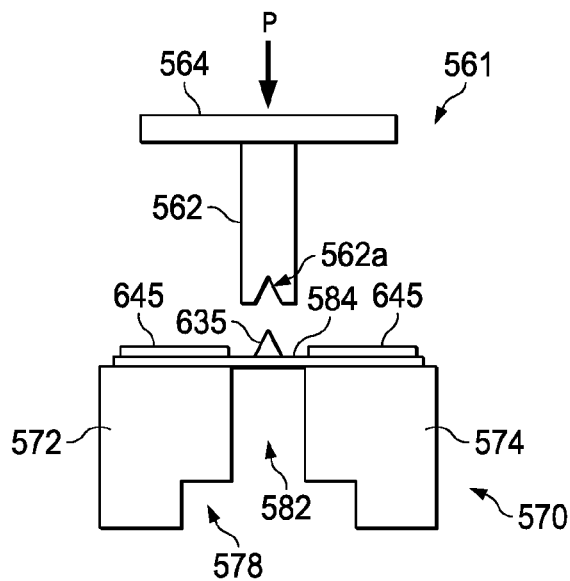
FIG. 59 is illustration of an alternate embodiment of the apparatus, showing a flat composite charge having been placed on the die set in preparation for stringer forming operation.

FIGS. 59-63 schematically illustrate sequential steps of an alternate method of forming a flat composite charge into an I-stringer 554 in which fillers are employed to fill voids in the stringer 554 that may result from folding of the stringer 554 during the forming process. Referring particularly to FIG. 59, a multi-ply, flat composite charge 584 is placed and indexed on top of a die set 570 comprising laterally displaceable die portions 572, 574 similar to those previously described. The die set 570 includes a recess 578 therein at the bottom end of a die cavity 582. Composite charge 584 is heated to its forming temperature by any suitable technique, such as placing a heating blanket 645 on the charge 584. A filler 635, sometimes referred to as a "noodle", formed of a composite or an adhesive is placed and indexed on the charge 584. A conformal punch 562 attached to a plate 564 is adapted to be driven into the die cavity 582 by any suitable means, such as by a press (not shown). The punch 562 may include a recess feature 562*a* configured to substantially match the geometry of the filler 635.

Figure 60:
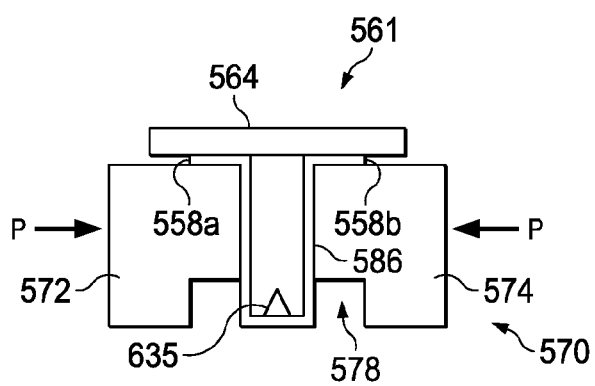
FIG. 60 is illustration similar to FIG. 59 but showing the punch having been forced into the die cavity to press form the charge into a stringer hat and stringer base.

Referring now to FIG. 60, the punch 562 along with the plate 564 are driven downwardly, causing the punch 562 to press form the charge 584 along with the filler 635 into the die cavity 582, producing a hat 586. Simultaneous with formation of the hat 586, the plate 564 forms the flanges 558*a*, 558*b* flat, down onto the die portions 572, 574, and lateral pressure P is applied to the die portions 572, 574 in order to compress the hat 586.

Figure 61:
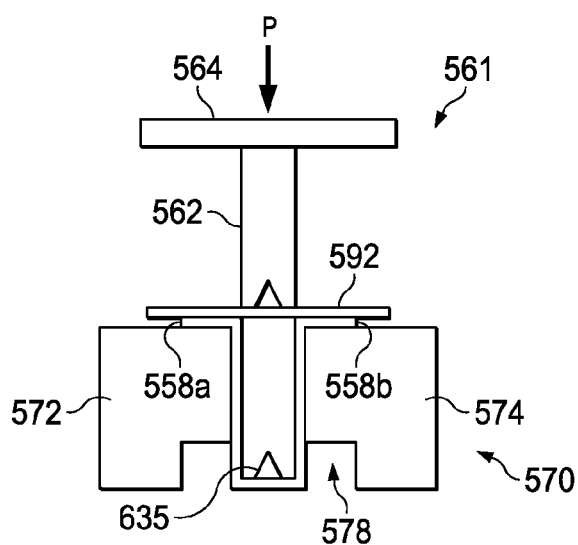
FIG. 61 is illustration similar to FIG. 60 but showing a later stage of the process in which the punch and an upper plate are used to apply pressure to the stringer base.
Figure 62:
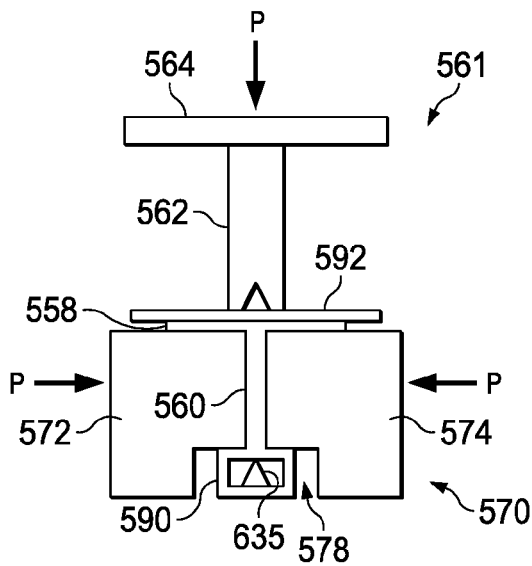
FIG. 62 is illustration showing a subsequent stage of the process in which the stringer hat has been collapsed into a stringer web having a bulb on the end thereof.

Next, as shown in FIG. 61, the punch 562 and plate 564 are withdrawn from the die cavity 582 and a press plate 592 is installed overlying the flanges 558*a*, 558*b*. Light downward pressure is applied by the punch 562, maintaining slight pressure on the flanges 558*a*, 558*b*. Then, as shown in FIG. 62, additional lateral pressure P is applied to the die portions 572, 574 in order to compress and thereby collapse the hat 586 into the web 560. However, the presence of the recess 578 prevents pressure from being applied by the die portions 572, 574 at the end of the web 560, and as a result, a bulb 590 containing the filler 635 is formed within the recess 578.

Figure 63:
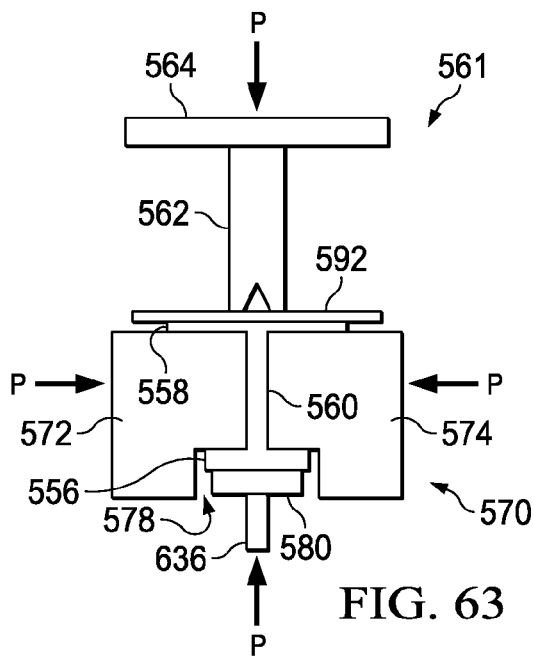
FIG. 63 is an illustration similar to FIG. 62, but showing the bulb having been press formed into a stringer cap by a press plate.

Referring now to FIG. 63, while lateral pressure is maintained on die portions 572, 574 and downward pressure is maintained by the punch 562, upward pressure P is applied to the bulb 590 by a press plate 580 driven by the ram 636. The pressure applied to the bulb 590 by the press plate 580 press forms the bulb 590 laterally outward into the recess 578, forming flat cap 556.

Figure 64:
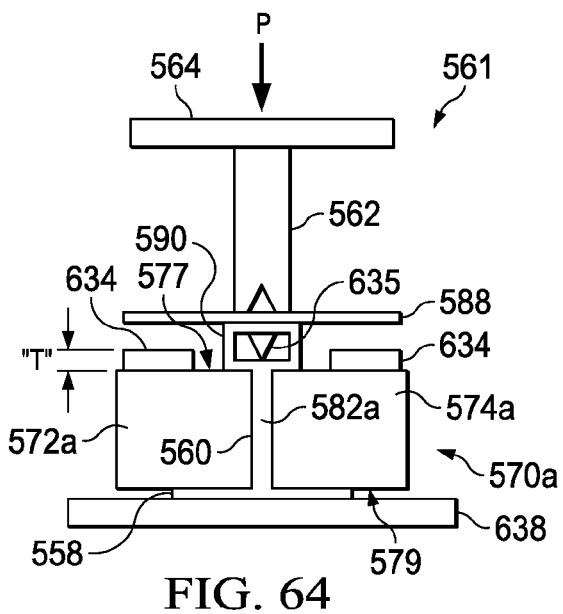
FIG. 64 is an illustration of tooling used to form the bulb into a flat cap according to an alternate method embodiment.

FIG. 64 illustrates an alternate technique for press forming the bulb 590 into the flat cap 556 after the composite charge has been formed into the shape shown in FIG. 62, using the die set 570 shown in FIGS. 59-63. The partially formed composite charge is removed from the die set 570 shown in FIGS. 62 and 63, and is then placed in an inverted position in a second die set 570*a* comprising laterally displaceable die portions 572*a*, 574*a*. The second die set 570*a* includes a central die cavity 582*a*, a substantially flat upper surface 577, and a substantially flat lower surface 579. The base 558 is sandwiched between the lower surface 579 of the die set 570*a*, and a base plate 638. A pair of shims 634 is placed on the flat surface 577 of the die 570*a*. The shims 634 have a thickness "T" substantially corresponding to the desired thickness of the cap 566. The bulb 590 is softened by locally heating it to its forming temperature. This local heating of the bulb 590 may be carried out by any suitable technique, such as by placing the die set 570*a* in an oven (not shown), directing infrared lamps (not shown) onto an upper press plate 588, or using internal electrical heating coils (not shown) in the die portions 572*a*, 574*a*.

The upper press plate 588 is placed on the bulb 590 and the punch 562 or similar device is brought into contact with the upper press plate 588. While lateral pressure is being applied to the web 560 by the die portions 572*a*, 574*a*, pressure P applied by the punch 562, and the upper press plate 588 press forms the bulb 590 down against the upper surface 577 of the die set 570*a*, causing the bulb 590 to flatten. The shims 634 limit flattening of the bulb 590 to the desired thickness of the cap 556.

Figure 65:
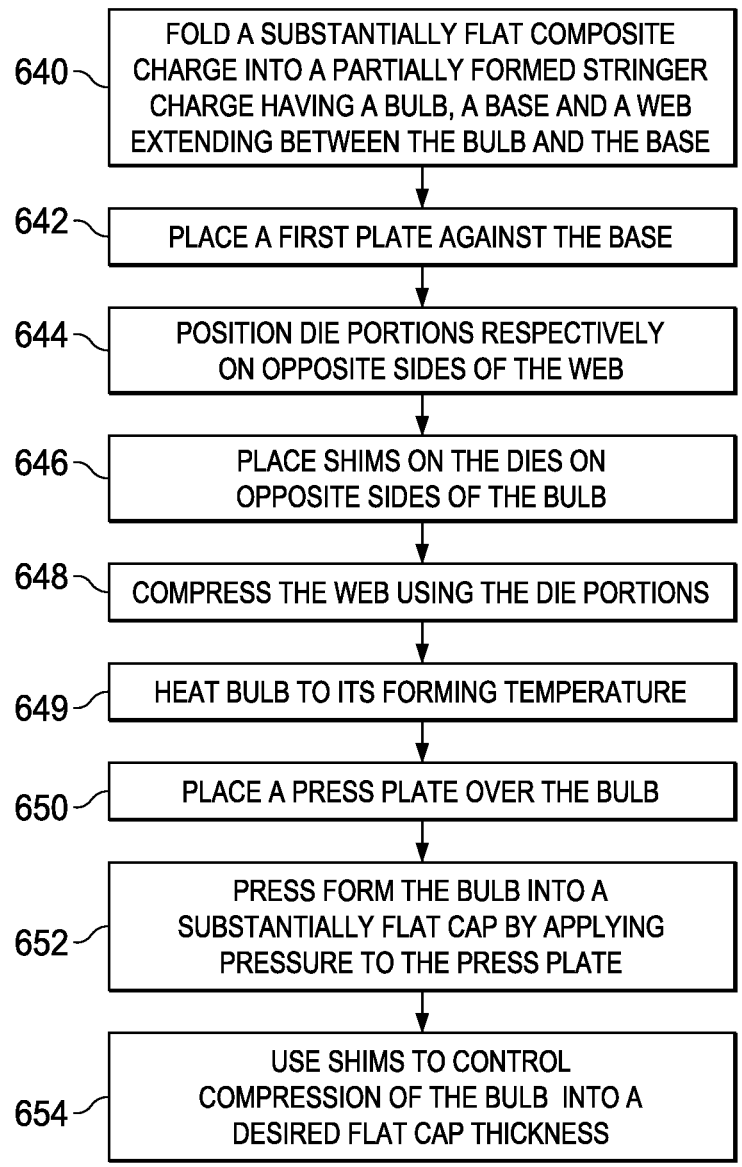
FIG. 65 is illustration of a flow diagram of an alternate method of forming a flat composite charge into an I-stringer.

Attention is now directed to FIG. 65 which broadly illustrates the overall steps of a method of forming a substantially flat composite charge into a stiffener such as an I-stringer 554, utilizing the second die set 570*a* described above in connection with FIG. 64. Beginning at 640, using the first set 570, a substantially flat composite charge 584 is folded into a partially formed stringer charge having a bulb 590, a base 558 and a web 560 extending between the bulb 590 and the base 558. At 642, a first plate 638 is placed against the base 558 of the stringer charge, then at 644, portions 572*a*, 574*a* of the die set 570*a* are placed on respective opposite sides of the web

560. At 646, shims 634 are positioned on the die set 570*a*, on opposite sides of the bulb 590. The shims 634 have a thickness "T" corresponding to the desired thickness of the stringer cap 556. At 648, the web 560 is compressed between the die portions 572*a*, 574*b*. The bulb 590 is heated to its forming temperature at 649, and at 650 an upper plate 588 is placed over the bulb 590. At 652, the bulb 590 is press formed into a substantially flat cap 556 by applying pressure P to the press plate 588 while lateral pressure is maintained on the web 560 by the die portions 572*a*, 574*a*. At 654, the shims 634 are used to control compression of the bulb 590 into a desired flat cap thickness.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of fabricating a composite I-stringer, comprising:
   folding a substantially flat charge into a partially formed stringer charge having a bulb, a base and a web extending between the bulb and the base;
   placing a first plate against the base;
   positioning die portions respectively on opposite sides of the web;
   placing shims on the die portions on opposite sides of the bulb;
   compressing the web using the die portions;
   heating the bulb to its forming temperature;
   placing a second plate against the bulb;
   compressing the bulb into a substantially flat cap by applying pressure to the second plate; and
   using the shims to control compression of the bulb into a desired flat cap thickness.

2. The method of claim 1, wherein the first plate and the second plate are substantially parallel surfaces.

3. The method of claim 1, wherein compressing the bulb comprises applying pressure in a substantially normal direction relative to a base of the composite I-stringer.

4. The method of claim 1, wherein folding includes forming the bulb on an end of the web.

5. The method of claim 4, wherein forming the bulb further comprises forming a portion of the web into a recess in the die portions.

6. The method of claim 1, wherein compressing the bulb is performed using a punch.

7. The method of claim 6, wherein compressing the web is performed by applying lateral pressure on the die portions.

8. The method of claim 1, wherein heating the bulb comprises locally heating the bulb.

9. The method of claim 8, wherein heating the bulb is performed before the bulb is compressed.

10. The method of claim 1, wherein the shims have a thickness corresponding to a desired thickness of the substantially flat cap.

* * * * *